US008289910B2

(12) United States Patent
Gabriel et al.

(10) Patent No.: US 8,289,910 B2

(45) Date of Patent: Oct. 16, 2012

(54) DEVICE FOR RECEIVING AND TRANSMITTING MOBILE TELEPHONY SIGNALS WITH MULTIPLE TRANSMIT-RECEIVE BRANCHES

(75) Inventors: Roland Gabriel, Griesstätt (DE); Alexander Seeor, Kolbermoor (DE); Stefan Fritze, Rosenheim (DE); Martin Güllner, Stephanskirchen (DE)

(73) Assignee: Kathrein-Werke KG, Rosenheim (DE)

( * ) Notice: Subject to any disclaimer, the term of this patent is extended or adjusted under 35 U.S.C. 154(b) by 94 days.

(21) Appl. No.: 12/429,334

(22) Filed: Apr. 24, 2009

(65) Prior Publication Data

US 2010/0271985 A1 Oct. 28, 2010

(51) Int. Cl.
*H04W 4/00* (2009.01)

(52) U.S. Cl. ......................... 370/329; 370/328; 370/330

(58) Field of Classification Search .................. 370/276, 370/278, 328, 329, 330, 334, 335, 345; 455/39, 455/63.3, 63.4, 65, 67.11, 69, 101, 135, 269, 455/272, 273, 274, 275, 277.2, 422.1, 452.1, 455/452.2, 512–513, 522, 550.1, 561, 562.1, 455/575.7, 277.1
See application file for complete search history.

(56) References Cited

U.S. PATENT DOCUMENTS

| | | | | |
|---|---|---|---|---|
| 5,267,234 | A * | 11/1993 | Harrison | 370/281 |
| 6,760,603 | B1 * | 7/2004 | Scherzer et al. | 455/562.1 |
| 7,079,809 | B1 * | 7/2006 | Scherzer | 455/39 |
| 2004/0085239 | A1 | 5/2004 | Ukena et al. | |
| 2004/0119562 | A1 * | 6/2004 | Sakano | 333/133 |
| 2006/0030275 | A1 | 2/2006 | Buer et al. | |
| 2006/0148524 | A1 * | 7/2006 | Ferrato et al. | 455/562.1 |
| 2007/0135117 | A1 * | 6/2007 | Matsuura et al. | 455/422.1 |

FOREIGN PATENT DOCUMENTS

| | | | |
|---|---|---|---|
| DE | 102005039458 | B4 | 3/2008 |
| DE | 212005000081 | U1 | 4/2008 |
| EP | 1320146 | A1 | 6/2003 |
| EP | 1909406 | A2 | 8/2007 |
| EP | 1643661 | B1 | 5/2008 |
| EP | 1816752 | B1 | 5/2008 |
| EP | 1923954 | A1 | 5/2008 |
| EP | 1926336 | A2 | 5/2008 |
| WO | 2007022430 | A2 | 2/2007 |
| WO | 2007027301 | A2 | 3/2007 |
| WO | 2008078103 | A2 | 7/2008 |

OTHER PUBLICATIONS

Office Action issued in corresponding German patent application (Dec. 14, 2009).

* cited by examiner

*Primary Examiner* — Kwang B Yao
*Assistant Examiner* — Adam Duda
(74) *Attorney, Agent, or Firm* — Nixon & Vanderhye P.C.

(57) ABSTRACT

An improved device for receiving and transmitting mobile telephony signals comprises at least 4 channels. Each of the at least 4 channels (K1, K2, K3, K4) can be controlled with a transmission signal, that is different from the other channels, which can be generated with a separate channel module (KM1, KM2, KM3, KM4) from various data streams. A controller device is provided for, via which several or all of the power amplifiers, which are connected in several or all channels (K; K1, K2, K3, K4), can be operated in-phase or phase-locked with each other, in such a way that the transmission signals (TX) amplified in the channels concerned (K; K1, K2, K3, K4) can be synchronized and interconnected. As a result, a transmission signal can be radiated with a higher transmission power.

21 Claims, 17 Drawing Sheets

DEVICE FOR RECEIVING AND TRANSMITTING MOBILE TELEPHONY SIGNALS WITH MULTIPLE TRANSMIT-RECEIVE BRANCHES

CROSS-REFERENCES TO RELATED APPLICATIONS

Statement Regarding Federally Sponsored Research or Development

Field

The invention concerns a device for receiving and transmitting mobile telephony signals with multiple transmit-receive branches.

BACKGROUND AND SUMMARY

In mobile telephony, there is a constant requirement to achieve ever-higher transmission speeds. Various technical standards have been created which have brought continued improvements in transmission methods. Thus in mobile telephony a distinction can be made, for example, between systems such as GSM (Global System for Mobile Communications), HSCSD (High Speed Circuit Switched Data), EDGE (Enhanced Data rates for GSM Evolution), UMTS (Universal Mobile Telecommunications System) and for example HSPA (High-Speed Packet Access). Here the UMTS method is referred to as a third generation technology.

Apart from this UMTS technology a further development, the Long Term Evolution (LTE) technology, is now on the horizon which will supersede or further develop UMTS. In this respect the LTE technology is also being referred to as the 3.9-generation, which thus in terms of its timing comes just before the fourth generation technologies, but which nevertheless compared to alternative technologies such as WiMAX should allow a comparatively cost-effective and "seamless", and therefore evolutionary, further development from UMTS to LTE.

Here, as will be known, the LTE technology uses Orthogonal-Frequency-Division-Multiplexing methods (OFDM), which ultimately are based on FDM technology, that is Frequency-Division-Multiplexing. FDM is an instance of a telecommunications multiplexing method, with which several signals can be transmitted simultaneously distributed over multiple carriers, whereby the multiple carriers are assigned different frequencies. The orthogonal FDM method is also an instance of a multi-carrier modulation method, in which multiple orthogonal carrier signals are used for digital data transmission.

Furthermore, here the LTE technology is also based on the MIMO technology, for which antennas are used which take account of the Multiple-Input-Multiple-Output principle.

LTE technology is also characterized here, for example, by comparatively low latency periods, whereby voice services (VoIP) or for example also video telephony can be improved. So, for example, with the 4×4 MIMO technology a peak data rate of, for example, more than 300 Mbps can be achieved in the downlink. In the process the uplink still achieves a peak data rate of over 75 Mbps, if for example a single antenna is used.

In known mobile telephony networks, on the base station side as a rule antenna are used which mainly have one or two antenna systems for the transmit branch and more often than not two antenna systems for the receive branch. The term "antenna system" here can mean two separate antennas, or also a dual polarized antenna with two decoupled connections for the two polarization planes which are perpendicular to one another. In the case of reception therefore, a polarization diversity that improves the reception quality or also a so-called space diversity is or are present.

Conventional mobile telephony base stations normally comprise all the essential parts that are necessary for operating such a base station. In order to minimize additional losses both in the transmission and reception direction, however, a module referred to as a Remote Radio Head (RHH) which is separate from the radio server and remote from this, i.e. as a rule in the vicinity of the antenna on a mast, can be provided. This essentially takes care of transmission and reception amplification and modulation of the carrier with the I/Q-signals transmitted via the optical interface. Communication between the radio server and the remote radio head RRH provided separately from this and in the vicinity of the mast preferably takes place via an optical interface.

As already mentioned in the latest mobile radio standard generation, the use of antennas is envisaged which comprise radiator devices in various slots.

This opens up the possibility outlined at the outset of operating the antenna using the so-called MIMO technology. Here several data streams are transmitted both on the transmission side and the reception side via the transceiver unit to the different antenna systems.

This also means that both for MIMO operation of the base station and also when conventional remote radio heads (RHH) are used the number of transceiver units required increases. Even if several transceiver branches are combined in a single housing, normally the number of A/D converters, the number of signal conditioning modules and the number of reception amplifiers increase approximately linearly with the number of antenna systems used.

A transceiver module for operating a mobile telephony base station employing MIMO technology is, for example, known from EP 1 923 954 A1. In such examples, the base station is equipped with an antenna device which comprises n slots, in which in each case offset vertically to each other dual polarized radiators are arranged, which for example radiate with an alignment that is at a +45° or −45° angle to the horizontal (or the vertical). Via a transmission unit the various slot inputs of the antenna device each have a transmission signal fed to them, with furthermore a receiver unit being connected to the various outputs of the antenna slots. Both the transmission unit and the reception unit have a number of connections for this purpose which are connected with the various connections on the slots of the individual antenna devices.

A MIMO system, for example with two transmission and two reception antennas, is also known from EP 1 643 661 B1.

Technology herein provides an improved transceiver module for reception and transmission of mobile telephony signals with multiple transmit-receive branches. The module is preferably operated with a radio server on the base station side. The module is preferably positioned in the vicinity of the antenna, for example on an antenna mast or other antenna installation point.

With the solution according to the invention an unexpectedly high variability is created which takes account of different transmission-reception scenarios and different development possibilities and thus allows cost-effective adaptations to be made according to changes in the requirements situation.

The solution according to the invention is characterized, inter alia, in that with the signal conditioning by channel of the transmission signal for the individual channels separate power amplifiers are provided, whereby for the transmission and reception of the signals for each channel or at least for the majority of the channels associated duplex filters are provided. Here the invention assumes that at least four channels are created. The essence of the invention is that a controller device is provided, via which several or all of the power amplifiers, which are connected in several or all channels, can be operated in-phase relation or phase locked to each other. This allows the transmission signals amplified in the channels concerned to be synchronized and thus interconnected with each other and alternatively by means of the multiple duplex filters that are present the individual channels can also be operated separately with various signals. This allows a transmission signal with a higher transmission power to be radiated.

The variability according to the invention as well as the possibility for adaptation according to the invention to various altered operational states, to frequency bands to be transmitted, carrier frequencies and so on, is preferably achieved in that a switching matrix is provided, via which the transmission signals with a specifiable carrier frequency and power amplifiers connected downstream can be fed as required to the various antenna systems. Here, via the switching matrix provided according to the invention, it is possible, for example, to feed to at least four transmission devices (frequency carriers) four separate antenna devices (whereby the four separate antenna systems can also comprise two slots with several dual polarized radiator devices, in which therefore radiators are provided in each of the two antenna slots, which because of their polarization direction or polarization planes being perpendicular to one another are decoupled from one another). It is also possible, however, by means of the switching matrix provided in accordance with the invention, for example with four transmission channels (transmission frequency carriers) to interconnect two, three or all four transmission signals on a single antenna input, whereby on the basis of the interconnection a higher transmission power can be achieved on an output.

According to the invention, however, it is also provided that the phase angles of the signals which are fed to the amplifiers, which are assigned to the individual transmission channels, are coupled in a phase-locked manner.

Thus in the context of the invention it is possible for, for example, two UMTS channels to be inter connected with a virtual doubling of the antenna beam power or for GSM carrier frequencies to be interconnected and fed to a second separate antenna input, etc. As mentioned, it is possible for all four transmission signals to be interconnected on one antenna input or for example for various carrier frequencies for various channels to be provided which feed the transmission signals to the different antenna inputs. In so doing in subsequent upgrades of the mobile telephony base station as a whole, new developments can be taken into account and for example a new channel based on the LTE technology or a number of channels based on the LTE technology implemented.

Generally speaking, according to the invention at least one 4-channel version of a transceiver unit is built, which is equipped with a controllable matrix circuit and with which, as mentioned, the power amplifiers provided for the respective transmission branch can be coupled in a phase-locked manner in the transmission channel concerned. With this configuration, ultimately different standards can be supported. In addition a previously unanticipated variety of configuration possibilities results. For in the context of the invention various carriers can be transmitted via various branches, whereby two or more identical carriers can be interconnected on a single branch, i.e. on a single antenna input. This transceiver module is preferably created in a remote radio head (RHH) with the at least four transceiver units mentioned, which can also have additional advantages:

- The at least four transceiver units can collectively use a high proportion of the signal conditioning. Thus, for example, a multiple ND converter can be provided, i.e. for example in a 4-channel design of the transceiver unit a 4×A/D converter can be used. Furthermore, for the up-mixing in the transmission branch of the respective channel and in the respective reception branches a phase-locked loop (PLL) with a common oscillator can be used, provided that the same carrier frequencies are involved. Ultimately the same applies equally to the use of an optical converter and the common power supply unit.
- For linearization and amplification control, the multiple transmission branches can use the transmission signal, which is decoupled from the corresponding signal branch by means of a decoupling mechanism and can be used in a faster sequential order for linearization (DPD)
- Also of advantage is the fact that according to the configuration selected, thus according to the transmission channels, the corresponding duplex filters suitable for this can be provided. Duplex filters may even be used which can be employed for different, i.e. various, frequencies or frequency ranges. For example, duplex filters or duplex separating filters with various dual frequency pairs would be conceivable which would be suitable, for example, for a 1,800 MHz range and for the UMTS range.
- In addition in a normal expansion scenario a new network cannot always be envisaged, if initially with the existing four or more antenna systems only one conventional standard (for example a GSM standard or a UMTS standard) is to and can be operated, or if possibly subsequently one or more or even all of the channels are not to be converted to the LTE standard or subsequent technologies. In the context of the invention, here, for example with a 4-channel solution, initially a 2×MIMO technology can be applied, in which for example two channels at a time are interconnected, in order then later to convert to a 4× solution.
- The advantage of interconnection is always that all the at least four channels provided can be utilized, even if, for example, at a given point in time only one or two transmission standards are to be applied. In such a case this leads to an increase in the transmission power, as mentioned.

Finally, a high bandwidth range of the device can be achieved by the duplex filter comprising at least two transmission signal band-pass filters connected in parallel. These two filters can be interconnected differently on the input side. In order to achieve a higher bandwidth range, the power amplifiers can also combine individual power amplifiers for different frequency ranges connected in parallel.

BRIEF DESCRIPTION OF THE DRAWINGS

Other advantages, details and features of the invention can be seen from the following embodiments discussed with the help of drawings. In detail, these show as follows:

FIGS. 5*a* to 14*a*: schematic representations supplementary to FIGS. 5 to 14 of the frequency range and power (and bandwidth) with which according to the different standards the transmission signals are transmitted;

DETAILED DESCRIPTION

Figure 1:
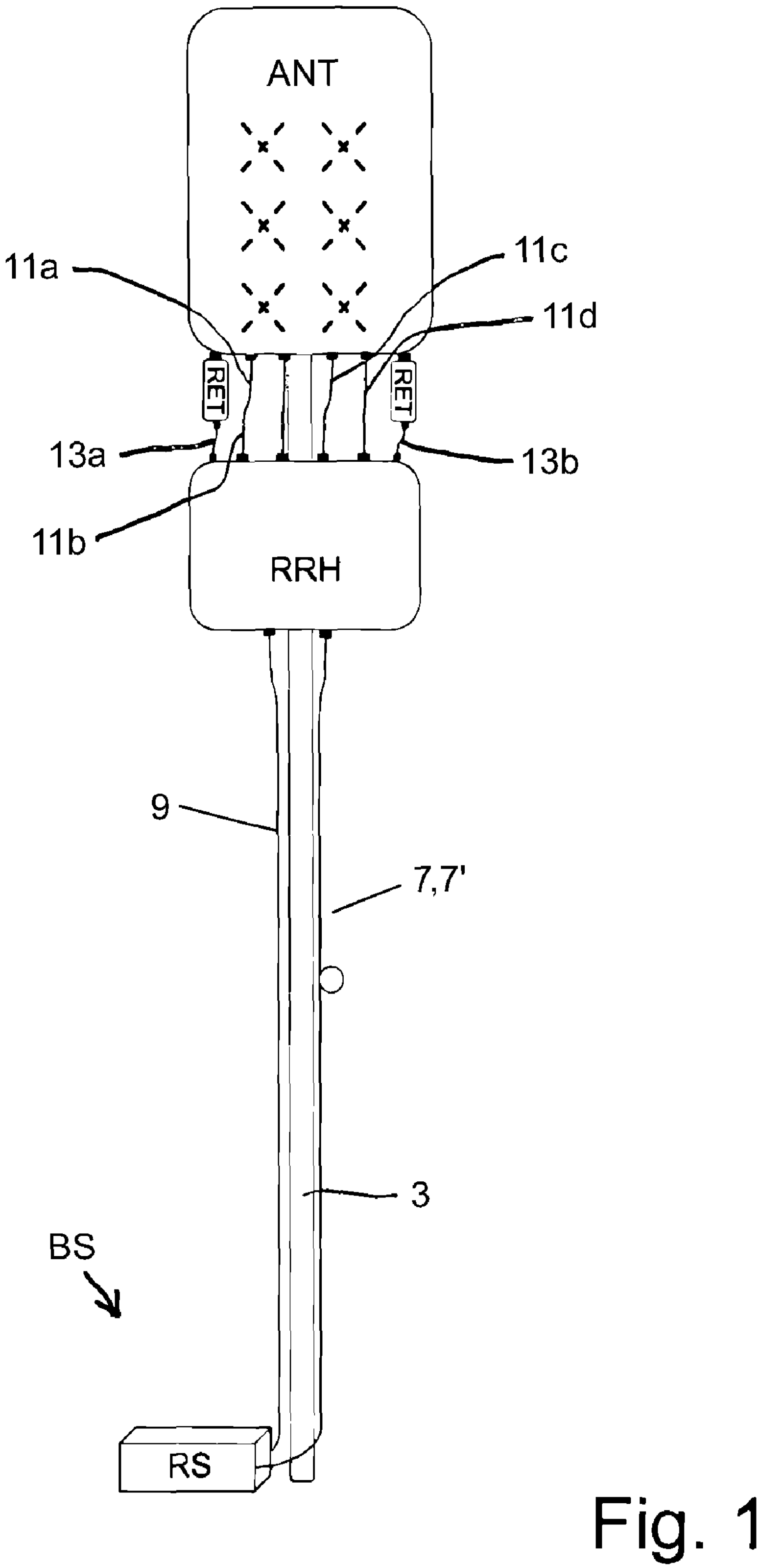
FIG. 1: an arrangement of a mobile telephony station according to the prior art with a radio server RS and a remote radio head RRH in the vicinity of the antenna mounted on the mast.

FIG. 1 shows an arrangement of a mobile telephony station according to the prior art. This mobile telephony base station comprises a radio server RS, which essentially performs all the base band functions of a base station, an antenna mast 3, several antenna devices or antenna arrays ANT mounted at the top of the antenna mast, and a remote radio head RRH mounted in the vicinity of the radio server RS and thus remotely from the radio server, which essentially performs the transmission and reception amplification and the modulation of the carrier signal. In the remote radio head RRH therefore essentially no signal conditioning of the individual mobile telephony subscribers takes place, but an essentially transparent conversion of an IQ data stream into a high frequency signal is carried out.

In the embodiment shown, two lines run between the radio server RS in the base station and the remote radio head RRH provided in the vicinity of the antenna, that is to say a main line 7, which preferably comprises a fiber-optic cable 7'. Via this main line 7 as a rule the transmission and reception signals and the control signals for operation of the remote radio head RRH are transmitted. The payload data and control data are also transmitted via the main line 7. In addition, between the radio server RS and the remote radio head RHH a further line 9 also runs, over which, for example, a direct current supply for the components provided in or on the antenna ANT and in the remote radio head RRH is possible Only in the event that the antenna arrangement shown in FIG. 1 is added as an extension to an existing antenna system and/or is made available by an existing antenna system normally with supply lines running between the base station BS and the antenna ANT, can the fiber-optic cable be dispensed with, if the IQ data stream and the control data are transmitted via the existing feed cable. For such a communication between the remote radio head (RRH) and the radio server (RS) a 64 QAM multi-carrier method or an OFDM method, for example, comes into consideration. Here over at least one of the available feed cables, not only the transmission, reception and control signals, but also the direct current (DC) necessary for operation of the various functional units of the remote radio head RRH can be transmitted and for example decoupled via a so-called bias tee at the corresponding electronic components.

Figure 2:
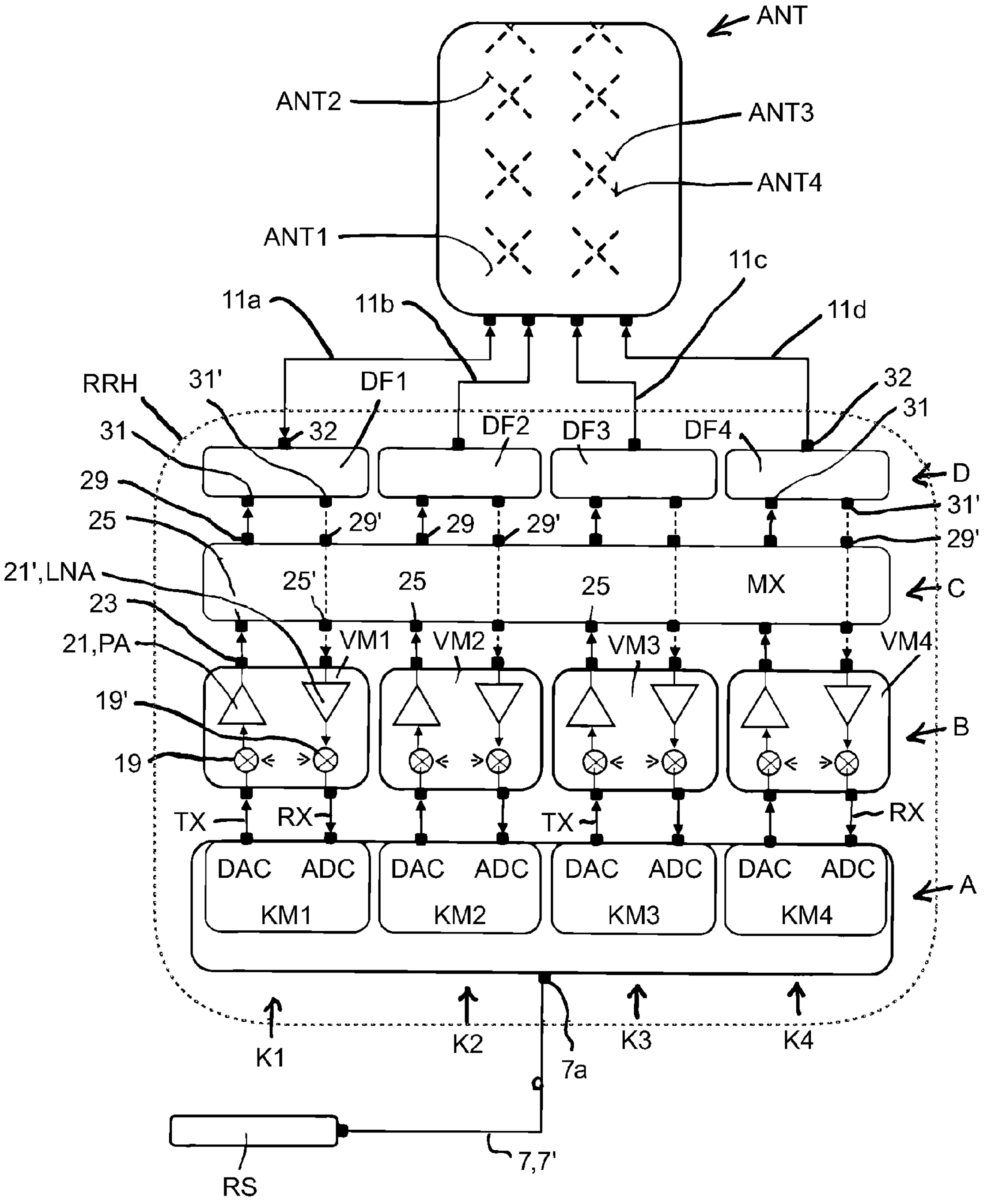
FIG. 2: a simplified representation of a basic configuration according to the invention.

The basic design of the remote radio head RRH can be seen from FIG. 2, whereby there likewise again the antenna device ANT and the radio server RS are shown, whereby via the said main line 7 for transmission of the transmission, reception and control signals, a connection is made with the RRH.

As already indicated in FIG. 1, with the RRH it is a case of a multi-channel RRH, that is to say in the embodiment shown for operation of at least four transceiver units, which in the following are in part referred to also as transmit-receive branches or also simply as channels, for short. Accordingly the antenna device also incorporates at least four separate antenna systems, which basically are also referred to as a four-slot antenna arrangement, although in practice only two slots at a time with dual polarized antennas are used, which for example are aligned at a +45° angle or a −45° angle to the vertical or horizontal. In the present case two slots of radiator devices (antenna arrays) are shown, which radiate in two polarization planes that are perpendicular to one another at said +45° angle or −45° angle, so that this ultimately results in four antenna systems ANT1, ANT2, ANT3 and ANT4, whereby each antenna device in each case is intended for a transmission channel. In other words, each antenna array with the respective polarization planes perpendicular to one another, within the meaning of the invention, forms a separate antenna system, so that in the embodiment shown ultimately four separate antenna systems ANT1 to ANT4 exist. However, as a deviation from this, more than four such separate antenna systems can be used.

Finally at this point, it is additionally noted in connection with FIG. 1, that between the RRH and the antenna device ANT, apart from the four transmit-receive lines 11*a* to 11*d* for the four separate antenna systems a further two additional transmission paths 13*a* and 13*b* (FIG. 1) can be provided namely, for example, for so-called remote electrical tilt (RET) units, via which, for example, the down-tilt angle can be adjusted by remote control, and thus the slope angle of the major lobe for the individual antenna systems. Further additional electrical and electronic devices, for example in the form of GPS devices, can be provided and operated correspondingly. There are no restrictions in this respect.

From the basic structure of the remote radio head RRH according to FIG. 2 it can be seen that this RRH can be broken down into four stages A to D.

On the input side of the RRH, where the main line 7 preferably ending with a fiber-optic cable 7', is connected, initially a digital platform A that can be configured in different ways is connected, which in the following will also be referred to for short as channel module stage A. In the case shown this stage essentially serves for transmit-receive signal conditioning for each of the four channels K1, K2, K3 and K4 in the embodiment shown.

For connection 7*a*, i.e. for the connection of the fiber-optic cable 7' for transmission of the payload and control data, as a connection interface 7*a*, for example an Ethernet connection (in particular a Giga-Ethernet connection) or for example a CPRI (common Public Radio Interface) or for example an OBSAI (Open Base Station Architecture Initiative) can be used or other suitable interfaces provided for.

For the four transmission and reception channels K1 to K4 for the transmission of the respective transmission signal TX to one of the associated antennas ANT1 to ANT4 in each case a digital-analogue converter DAC and conversely for the reception of a signal RX received from one of the antennas ANT1 to ANT4 an analogue-digital converter ADC can be provided in channel module stage A.

Accordingly the abovementioned digital-analogue converter or analogue-digital converter can be subdivided into channel modules KM1 to KM4. As indicated further in the following, these channel modules can for example be controlled with additionally provided control units, microprocessors, storage elements and so on, via a field-programmable gate array FPGA, which allows conditioning in parallel for the payload and control data. As shown further on, channel modules KM1 to KM4 can have the most varied of configurations, in order to allow via these the most varied of services if necessary (e.g. GSM services, UMTS services, LTE services and so on) to be provided.

The next stage B comprises a mixer and/or amplifier stage B, which ultimately could also be implemented as two separate stages for signal mixing or amplification.

In addition, an amplifier/mixer module VM1 to VM4 for the channel-dependent transmission path TX with a mixer 19 is provided for each channel. The amplifier/mixer modules VM1 to VM4 mixes the analog transmission signals up to the carrier frequency. Conversely, in the respective reception branch RX of any channel, a corresponding mixer 19' mixes down the reception signal.

The TX signal mixed up via the mixer 19 to the carrier transmission frequency is amplified after the mixer 19 via a power amplifier (PA) 21. The signal RX received in the respective mixer-amplifier stage B is in the opposite direction via a low-noise amplifier (LNA) 21' likewise amplified prior to mixing down in the mixer 19'.

The outputs 23 on the antenna side for the respective transmission signal TX to the mixer-transmitter stage B provided for each channel are connected with corresponding inputs 25 to a switching matrix MX, which is designed as an n/n switching matrix. This switching matrix forms the third stage C.

On the antenna side as the final stage D for each channel K1 to K4 a duplex filter DF1 to DF4 connects to this switching matrix, which on the output 29 for the transmission signal TX on the antenna side in each branch feeds the correspondingly mixed up, amplified and conditioned transmission signal to a first input 31 of a respective duplex filter DF1 to DF4 and at the antenna connection 32 via the transmit-receive line 11*a* is fed the associated antenna system. The connection 32 from the first duplex filter DF1 is for example connected via the transmit-receive line 11*a* with the first antenna system ANT1. Accordingly the duplex filters of the other channels K2 to K4 are connected with the other antennas ANT2 to ANT4 via the respective antenna lines 11*b* to 11*d*.

Alternatively the RX signal received via the respective antenna system is fed via the transmit-receive line 11*a*, 11*b*, 11*c* or 11*d* concerned to the respective connection 32 of the respectively assigned duplex filters DF1, DF2, DF3 or DF4 and by virtue of the band-pass filter is then as a reception signal RX via the connection 31' fed to the matrix connection 29', switched-through via the reversing matrix MX, and in fact to the radio server-side connection 25', where the RS reception signal concerned is fed to the respective amplifier-mixer stage B, in order in the amplifier provided there 21' to be amplified and mixed down in the subsequent mixer 19'.

From this structure, it can already be seen that that the RX signal received from each antenna system ANT1, ANT2, ANT3 or ANT4 is fed via the respective duplex filter DF1, DF2, DF3 or DF4 in duplex filter stage D separately through the switching matrix or past this to the respective separately assigned amplifier (LNA amplifier) 21' with the following stage 19, in order then in the ADV converter of the respective channel in the channel module stage A to be digitized and passed via the main line 7 to the radio server RS.

In order to better understand the multitude of different switching possibilities for the operation of the antenna system described, in the following, using FIG. 3 and FIG. 4, the first and second stages A and B are explained in even greater detail.

Figure 3:
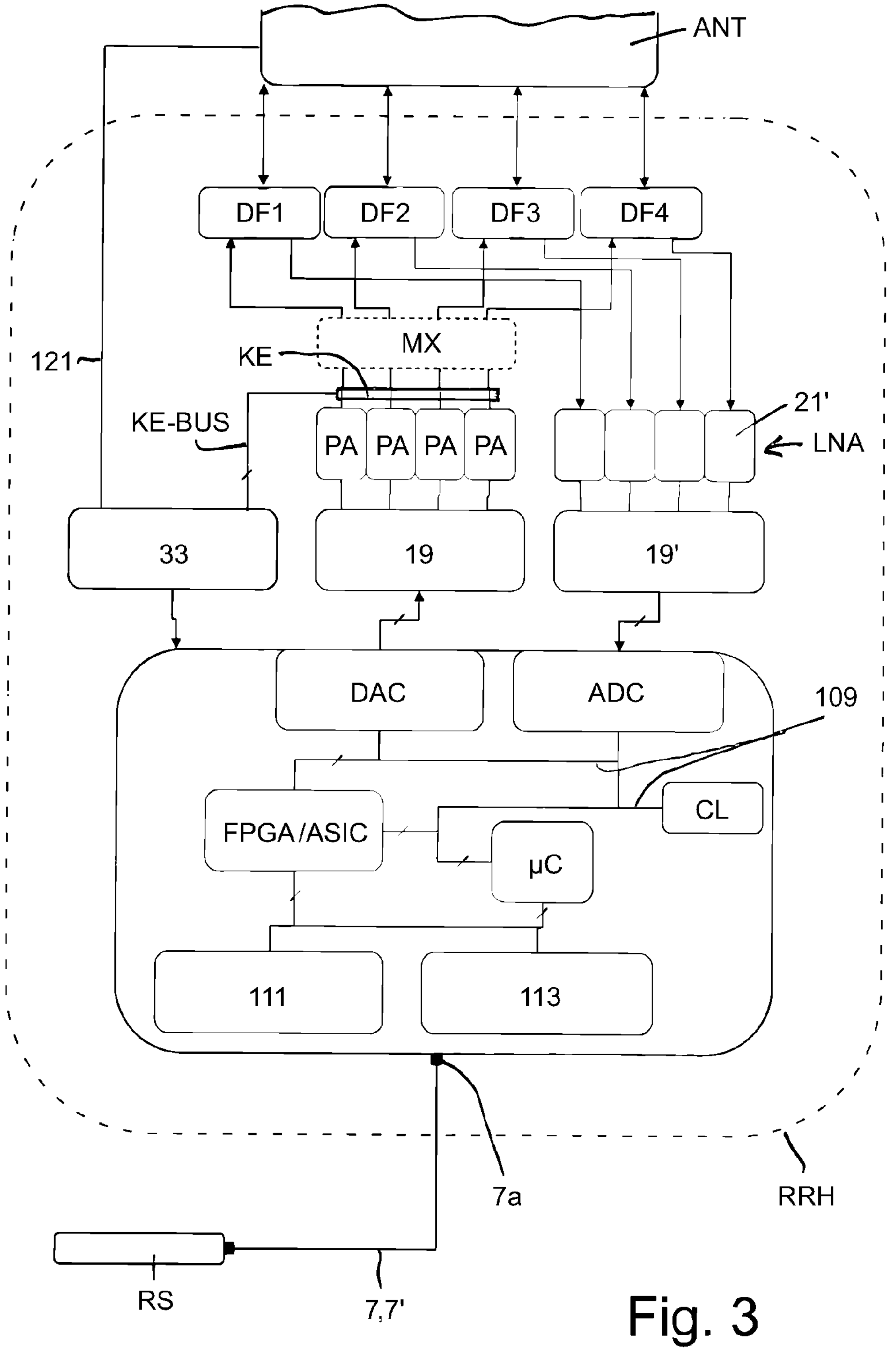
FIG. 3: a representation of the radio server RS from FIG. 2 shown in more detail.

From FIG. 3 it can be seen that the reconfigurable digital platform allowing multiple standard settings in the channel module stage A inter alia comprises a programmable integrated circuit, for example an FPGA or an ASIC, which allows a parallelized signal conditioning for the payload data and control data. This also allows the corresponding data to be forwarded in parallel to the digital-analogue converter or the signals received by the analogue-digital converters to be delivered to the radio server RS.

In the mixer-amplifier stage B shown in FIG. 3 in addition a controller device 33 with a feedback loop can also be provided. Since the amplifier 21 in each channel in the mixer-amplifier stage B is also provided with phase correction, it is possible, via the controller device 33 to control all amplifiers 21 for each channel in-phase and also to call upon the controller device 33 for performing linearization of the amplifier. Ultimately this allows, where necessary, the transmission signals for the various channels to be interconnected differently, since through this technical measure the power transformers 21 can be coupled phase-locked, i.e. in-phase. To this end said controller device 33 is preferably used for all channels. Due to the high proportion of collective signal conditioning there is likewise a further simplification of the overall structure.

FIG. 3 also shows a microprocessor μC which is further required for control and the so-called clock as the clock generator CL. Apart from the internal bus structure 109 for the interface 7*a* a service interface 111 (e.g. Ethernet, USB, serial RIT, etc.) and a data control interface to the radio server are most importantly schematically suggested (e.g. CPRI, OBSAI, etc.), provided with reference 113.

For the in-phase control of the individual power amplifiers 21 in channels K1 to K4 from the transmission signal TX by means of a coupler device KE a signal is decoupled, on the basis of which the in-phase control of all power amplifiers 21 in the other and preferably all channel stages is carried out. In the embodiment shown the coupler device KE ultimately comprises four separate couplers, which are assigned to the individual power amplifiers PA. Furthermore from the transmission signal a signal for linearization and phase coupling can be decoupled, which is fed via a control unit 33 for phase calibration as a stage A feedback signal. In addition this decoupling mechanism, for the respective transmission signal, in each of the four transmission paths in the embodiment shown can also be used for linearization of the power amplifier. This decoupling mechanism can be constructed in such a way that the respective transmission signal is decoupled from the respective output of the amplifier 21 or the antenna-side output of the duplex filter 32 and in rapid sequential order is compared with a reference signal for in-phase control of the power amplifiers, and furthermore the same mechanism can be simultaneously used for linearization of the transmission signal. However, the phase correction can be carried out by a coupler KE that works not sequentially but in parallel, for example a Wilkinson coupler. In this case, however, for the various channels separate test signals must be used. In both cases a simplification of the overall structure results, since the four transceiver units in the embodiment shown make shared use of the signal conditioning to a large extent.

In certain cases it may be helpful to carry out the linearization and/or phase calibration in such a way that a signal is decoupled from the respective transmission paths after the duplex filters DF1 to DF4 or from the transmission signal TX, to which end the optional decoupling path 121 is provided for the purpose, which in turn in the embodiment shown leads to the control unit 121.

Figure 4:
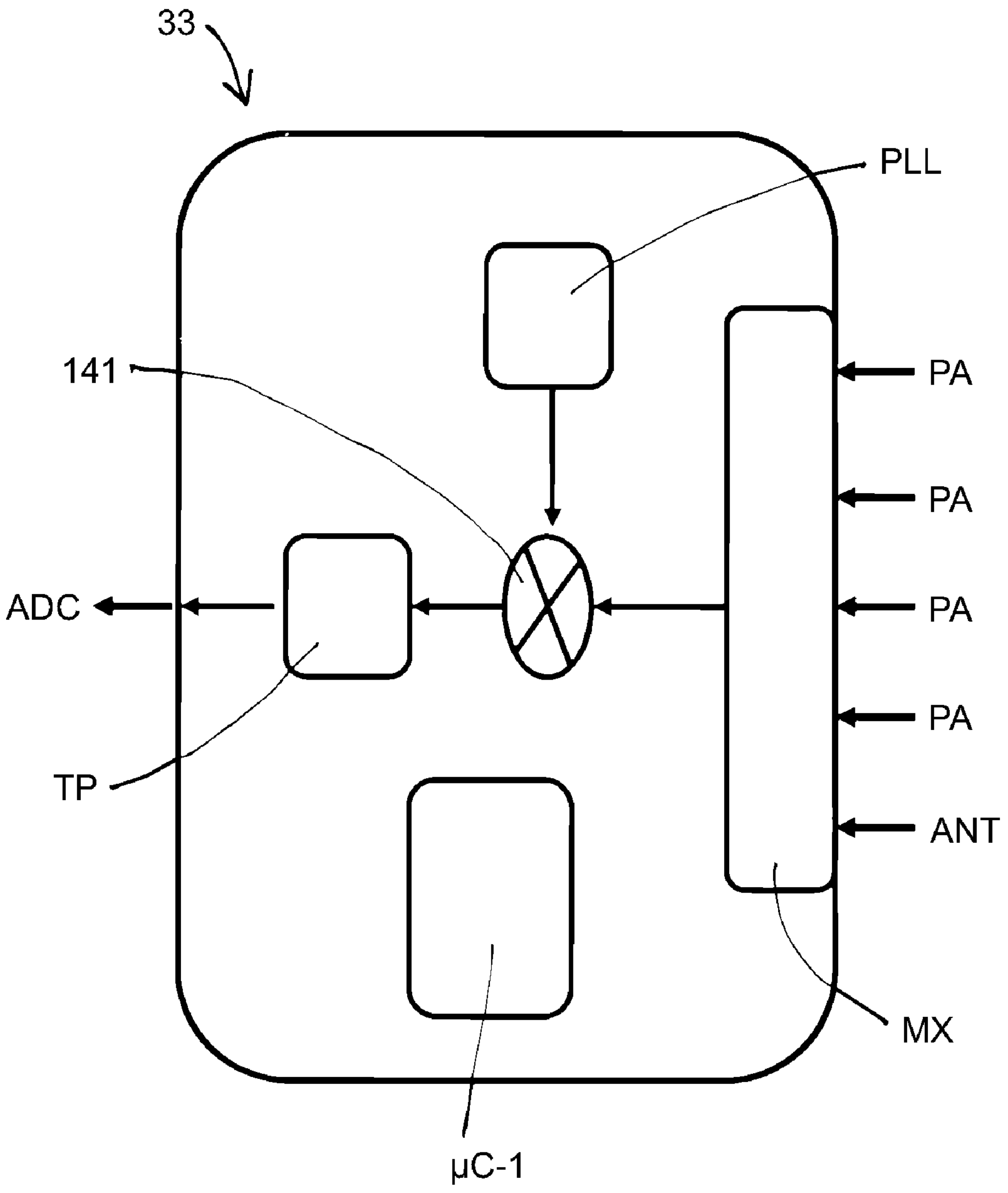
FIG. 4: a further detailed representation of a control unit for the linearization and phase calibration, as used in the representation according to FIG. 3.

With the help of FIG. 4 a description is provided of said control device 33 in even greater detail, in which for example via four inputs of the coupling device KE and the coupling bus KE-BUS of the control device 33 the corresponding decoupling signals for linearization and/or phase calibration are fed. Finally in FIG. 4 a further separate input coming from the antenna ANT is provided for, if the corresponding signals from the four transmission paths for example are decoupled after the duplex filters or from the antenna input.

In the control unit KE it can also be seen that here again a microprocessor μC-1 is provided, a mixer stage 141, a low-pass TP and a phase-locked loop, thus a phase correction loop, in order to adjust the phase angle and thus the associated frequency of a changeable oscillator and thus of the mixer 141. With this control unit 121, therefore, ultimately the antenna can be precisely calibrated, since the phase angle is precisely adjusted.

In the process FIG. 4 also shows how via a low-pass TP the corresponding control of the analogue/digital converter ADC takes place.

In the following, using various embodiments, an explanation is now provided of how the structure according to the invention can be used in order to use the antenna device in particular for a mobile telephony system for varying requirements.

In so doing the various scenarios discussed in the following are also listed using the tabular overview attached in the annex, in which various configuration possibilities are described.

Figure 5:
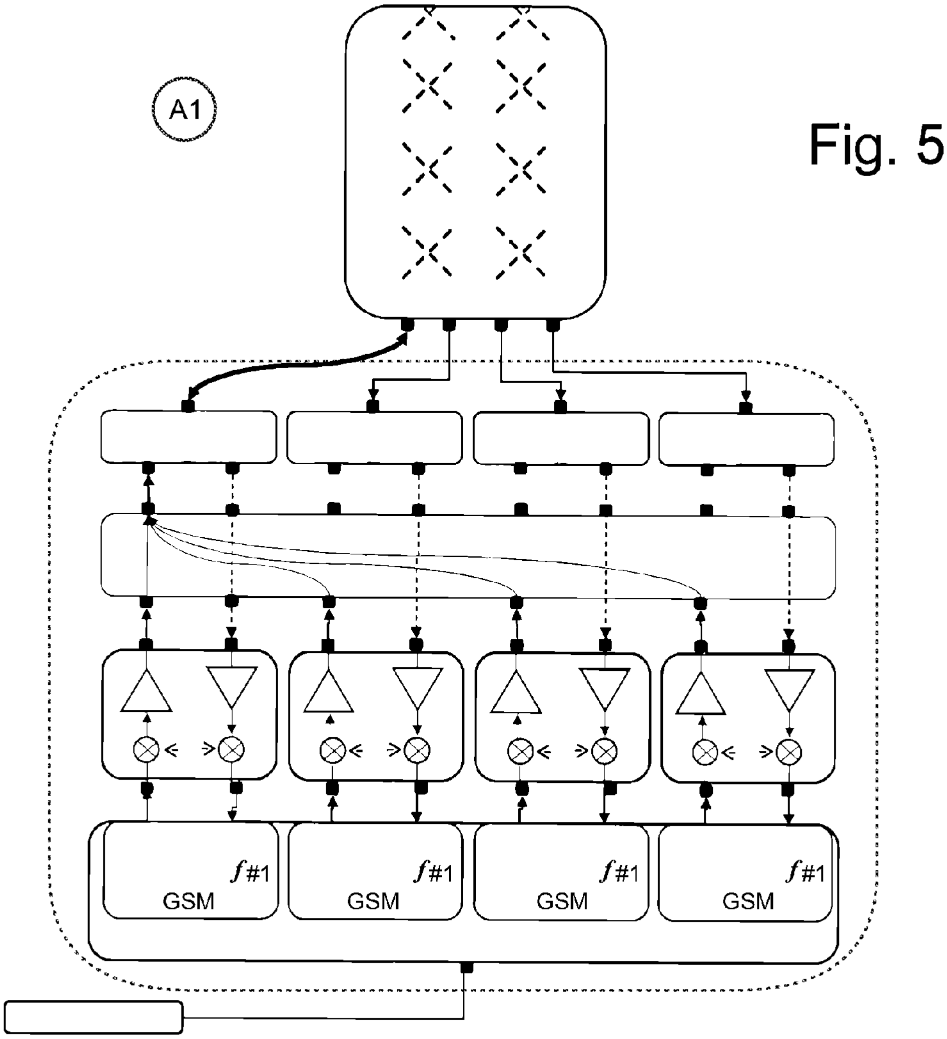
FIGS. 5 to 14: examples of different configurations of the device for transmission and reception of signals in particular for the area of mobile telephony.
Figure 5A:

In the course of this FIG. 5 describes an embodiment with a configuration A1, in which the overall structure described with the help of FIG. 2 is used for the operation of an antenna system, in which the antenna as a whole is operated in just one frequency according to the GSM standard, thus in all four channels. In the course of this in FIG. 5, as also in the subsequent figures, in each case an accompanying figure is provided, here FIG. 5*a*, in which on the horizontal axis with increasing frequency F the transmission frequency selected in this embodiment for the GSM standard is plotted, and on the Y-axis the achievable power P. Since in this embodiment all four channel amplifiers 21 are operated phase-locked with each other, it is possible, via the switching matrix MX to interconnect all four transmission signals amplified in the four channels and via the common matrix output 31 of the first channel K1 to feed the connection 32 via the transmit-receive line 11*a* of the antenna device ANT1.

This therefore allows a particular large range to be achieved by the transmission signal.

In this, as in the subsequent embodiments, it is assumed that the amplifier 21 in the first channel and in the second channel in each case generates a transmission power of, for example, 25 Watts, whereas the amplifier 21 for the third channel K3 and the fourth channel K4 only has a transmission power of 15 Watt in each case. By interconnecting all transmission signals a GSM transmission signal of 80 Watts thus results and a greater transmission range is achieved. The corresponding data for the channels or slots 1 to 4 are shown in the abovementioned attached tabular overview under configuration A1.

This interconnection of the four transmission signals is possible because the phase angles of the four amplifiers 21 are synchronized. The decoupling of a feedback signal necessary for the linearization of the amplifiers is thereby simultaneously also used for phase correction.

The configuration A1 in question, as also all the other configurations that are described in the following plus other configurations which are not explained using the drawings and which are possible within the context of the invention, are for example shown in the tabular overview attached as an annex, and in fact with all the important individual data for the operation of the respective configuration.

Already from the embodiment according to FIG. 5 concerning configuration A1 it will be noted that unlike the transmission signals TX (which for example in the variant according to FIG. 5 are interconnected in a synchronized manner and are fed to just a single antenna system ANT1—they can also be fed to another antenna system ANT2, ANT3 or ANT4), all reception signals RX in all four antenna systems ANT1 to ANT4 are switched separately from one another through the respective duplex filter device DF1 to DF4 past the switching matrix MX or through this by channel, so that the RX signal received via the respective antenna device is fed to the respective associated amplifier module VM1, VM2, VM3 or VM4 and then to the respective channel module KM1, KM2, KM3 or KM4, e.g. therefore the AD converter provided for each reception signal with associated digital signal conditioning, in order then to be switched through to the radio server RS via the fiber-optic cable 7.

In a departure from the embodiment shown a configuration A2 (listed only in the attached table and not in the drawings) could also be created, in which for example the outputs 29*a* and 29*b* for the first and second channels and outputs 29*c* and 29*d* for the third and fourth channels are interconnected so that via the transmit-receive line 11*a* the antenna slot or the antenna system ANT1 is fed a GSM standard signal at a first carrier frequency f1 with a strength of for example 50 Watts and the second antenna system ANT3 a GSM signal at a second carrier frequency f2 with a total power of 30 Watts.

Figure 6:
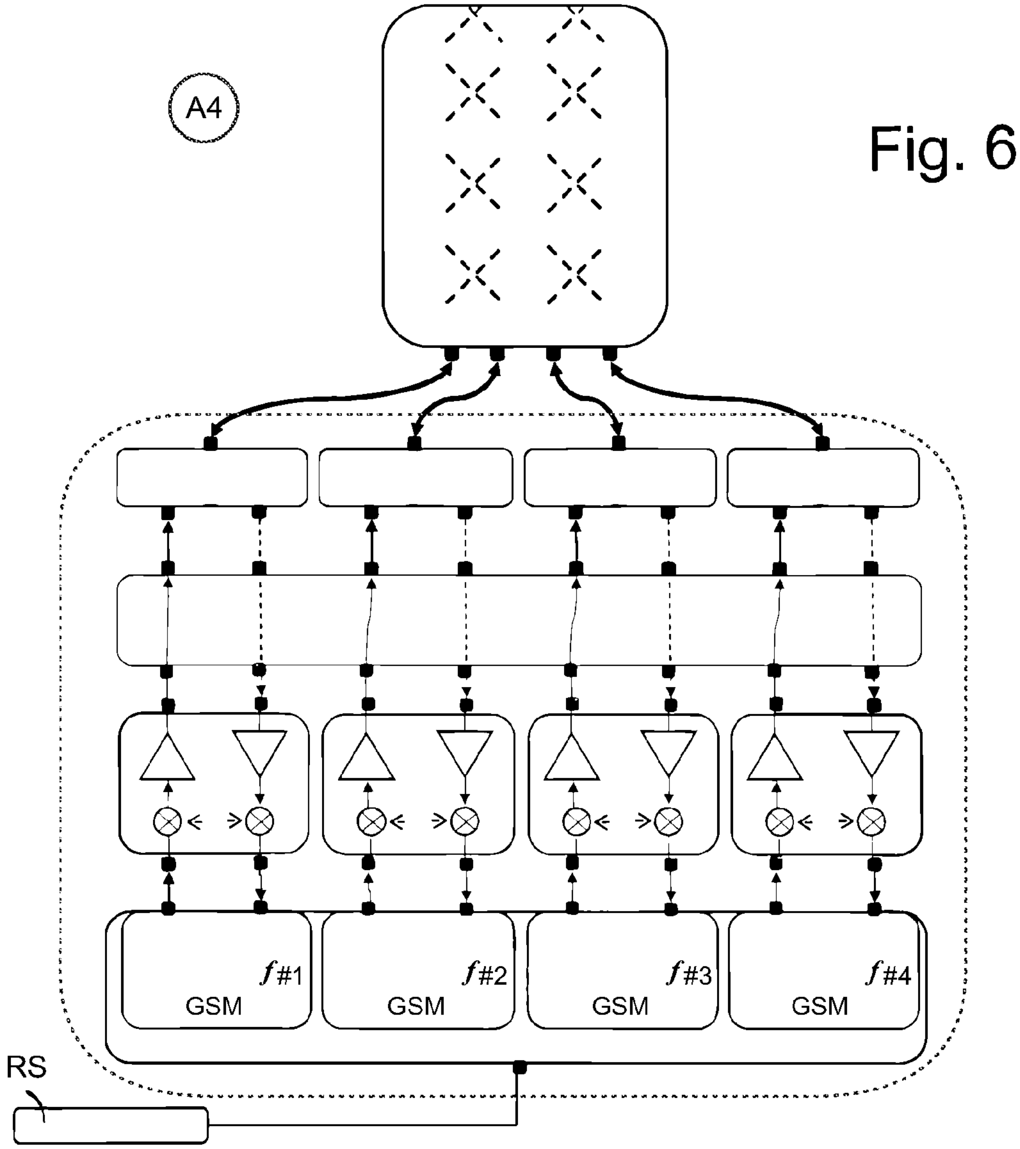
Figure 6A:
FIG. 6*b*: a modified embodiment from FIG. 2 and FIG. 6*a* dispensing with the switching matrix.

With the help of FIGS. 6 and 6*a* (configuration A4) it is shown how in the context of the invention it is of course also possible for each channel to be operated separately from the others, i.e. in each channel the transmission signals TX amplified via the amplifier 21 are fed via the small switching matrix MX to the four separate duplex filters DF1, DF2, DF3 and DF4 and via the four separate send-receive lines 11*a*, 11*b*, 11*c* and 11*d* to the four antenna systems ANT1 to ANT4. According to this variant, as shown in FIG. 6*a*, four GSM signals can be radiated in four carrier frequencies f#1 to f#4 offset from each other and with a lower transmission power compared with the above examples, whereby two channels radiate at 25 Watts and two channels at 15 Watts.

Whereas in previously known RRHs several carriers are transmitted with different frequencies via the same power amplifier (PA), whereby the requirements on the power amplifier (PA) are considerably increased (for it must operate as a multi-carrier power amplifier), in the context of the present invention the advantage arises that in each case only one GSM carrier has to be amplified by an amplifier, by which means the total effort, in particular the intermodulation requirements, are considerably reduced. Compared with the known combination of several transmission amplifiers via passive combiners (hybrid combiners) the solution according to the invention offers the advantage of a virtually loss-free interconnection, while the combiner solution loses at least 3 dB.

Here also, as in all the examples shown, the signals received RX are fed over the four transmit-receive lines 11*a* to 11*d* separately from one another via the duplex filter to the amplifier stages LNA provided for in the individual channels K1 to K4, i.e. the amplifier stages 21' and mixers 19', in order then to be fed via the four separate analogue-digital converters and the subsequent common signal transmission line 7 to the remote server.

The fact that the reception signals are always conditioned separately for each channel and then transmitted together via the man line 7, applies for all the other embodiments discussed in the following. However, it is also conceivable that already in this transceiver unit an in-phase summation of the various RX signals is carried out, in order thereby to generated one or more resultant radiation diagrams of the antenna slots and to transmit these summed signals to the RS. Further signal conditionings in the RRH are conceivable.

Figure 6B:
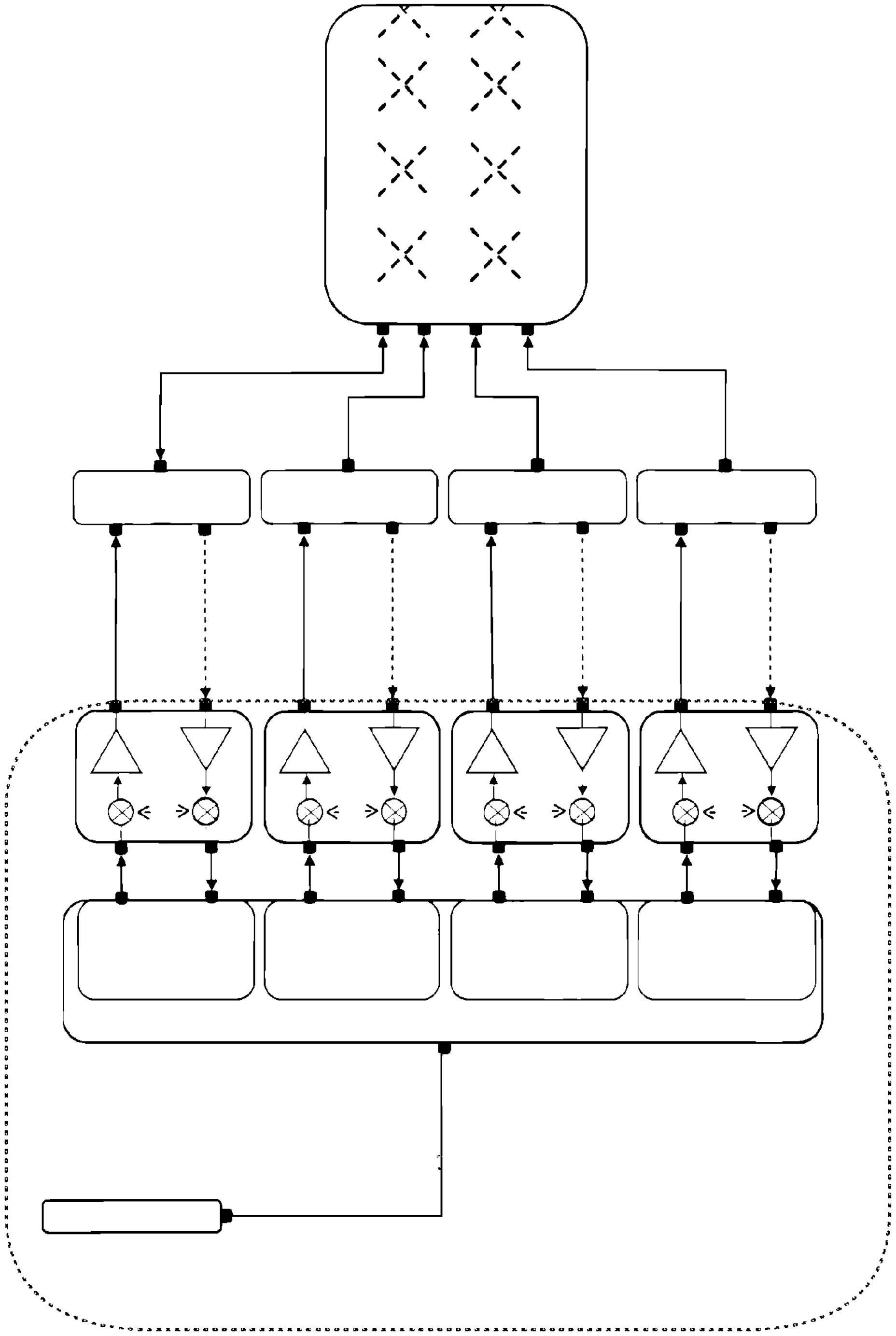

By way of deviation from the embodiment according to FIG. 6*a* a specific variant according to the invention is explained with the help of FIG. 6*b*. The structure according to FIG. 6*b* basically corresponds to that which has been explained with the help of FIG. 2, FIG. 3 and FIG. 4, and also with the help of FIG. 6*a* for the configuration A3 described there. The particular feature in the present case is now, however, that with the variant according to FIG. 6*b* the switching matrix MX is dispensed with. In other words, the outputs 23 of the amplifier/mixer modules VM1 to VM4 are connected directly with the corresponding inputs 31 to the filter stages DF1 to DF4 (and in fact for the transmission signals TX). Similarly the connections 31' to the filter stages DF1 to DF4 for the forwarding of the reception signals RX are connected directly with the connections for the LNA reception signal amplifier 21'. In this embodiment variant also the channels can thus be operated separately from one another. A number of advantages result concerning the standards to be used, which can be preselected to be different, for correspondingly different selection of the bandwidth of the signals selected, the transmission powers of the amplifiers BA selected for the individual channels, etc.

Figure 7:
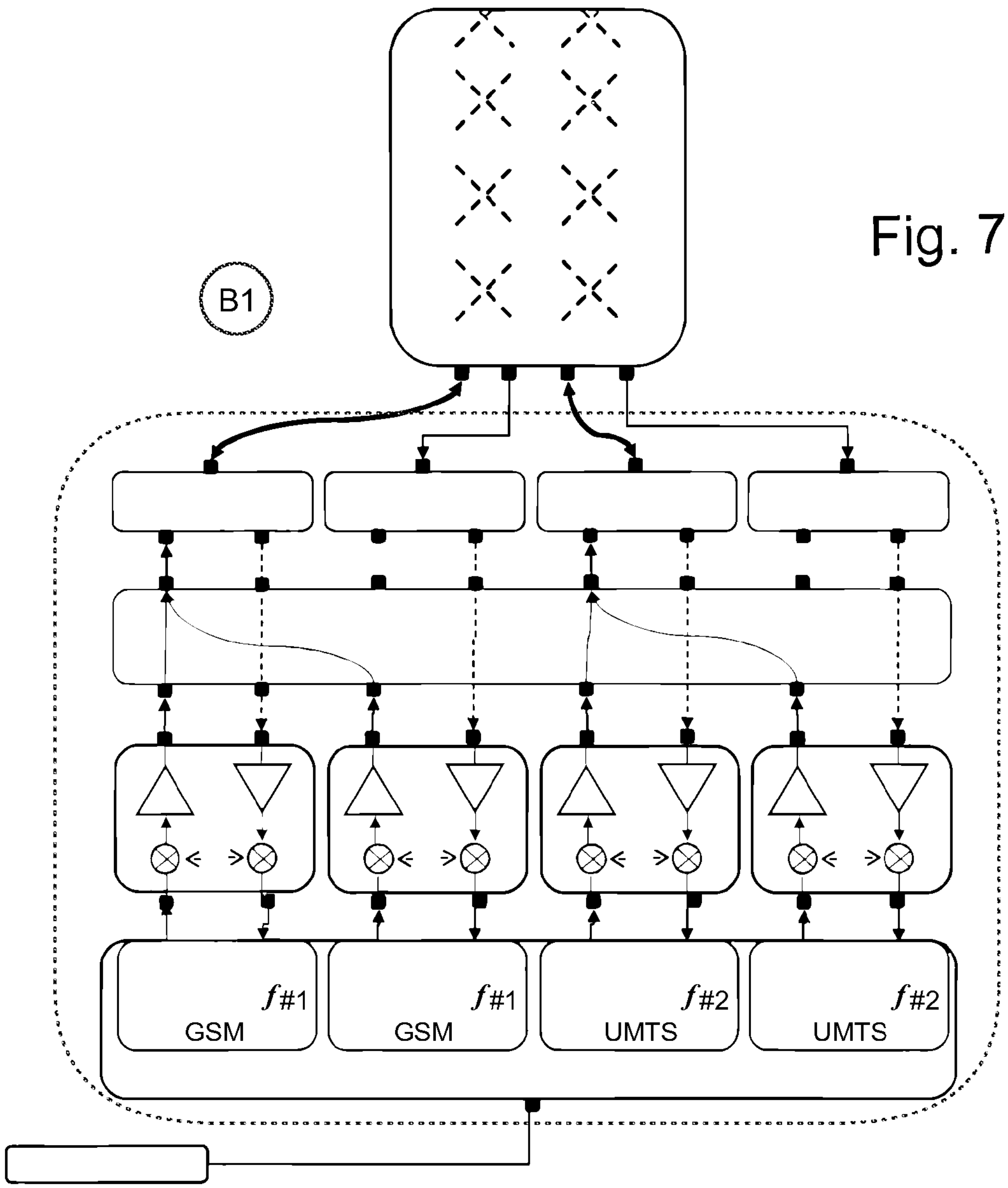
Figure 7A:
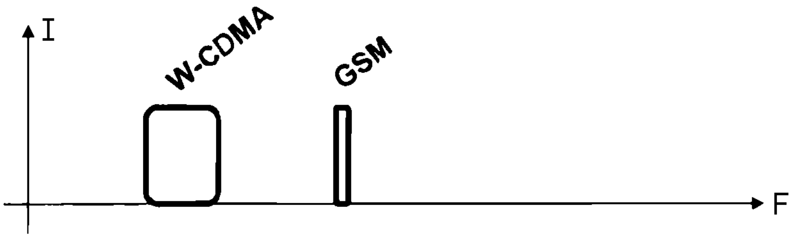

With the help of FIG. 7 an embodiment is shown according to configuration B1 in the attached Table.

With this variant in the first and second channels K1 and K2 at a common carrier frequency a GSM standard signal is conditioned and transmitted. In the third and fourth channels K3 and K4 on a common carrier frequency a UMTS signal is conditioned and transmitted. In this way with the selection indicated of the amplifier concerned, a transmission signals can be transmitted in a common channel according to the GSM standard at 50 Watts in order to achieve an increased range in this standard and a transmission signal with 30 Watts in a further channel according to the UMTS standard, likewise with an increase in the range compared with an individual channel. Here the UMTS signal is sent according to the W-CDMA method (Wideband Code Division Multiple Access), in which the transmission signal has a marked spread, so that it occupies a larger bandwidth and thus is less susceptible to faults from narrow-band interference pulses. In addition in this way the transmission power per Hertz can be reduced. As a result a greater bandwidth of, for example, 5 MHz results.

With the help of the attached table, by way of example configurations B2, B3 and B4 are also shown, whereby according to configuration B2 for example the first two GSM channels (which each have a 25-Watts amplifier 21) are interconnected, resulting in a single GSM channel with a power of 50 Watts with the achievement of an increased transmission range. The two UMTS channels K3 and K4 are operated separately, whereby in this embodiment they then result in two UMTS carrier frequencies each with 15 Watt power.

In configuration B3, by way of example the two UMTS channels K3 and K4 are interconnected, which thus results in a single UMTS carrier with 30 Watts, whereas the two GSM channels K1 and K2 radiate two separate carriers TX1 and TX2 each with 25 Watts.

In configuration B4, similar to configuration A3, all channels are separately operated so an overlaying and combining of the individual transmission signals is not carried out.

Figure 8:
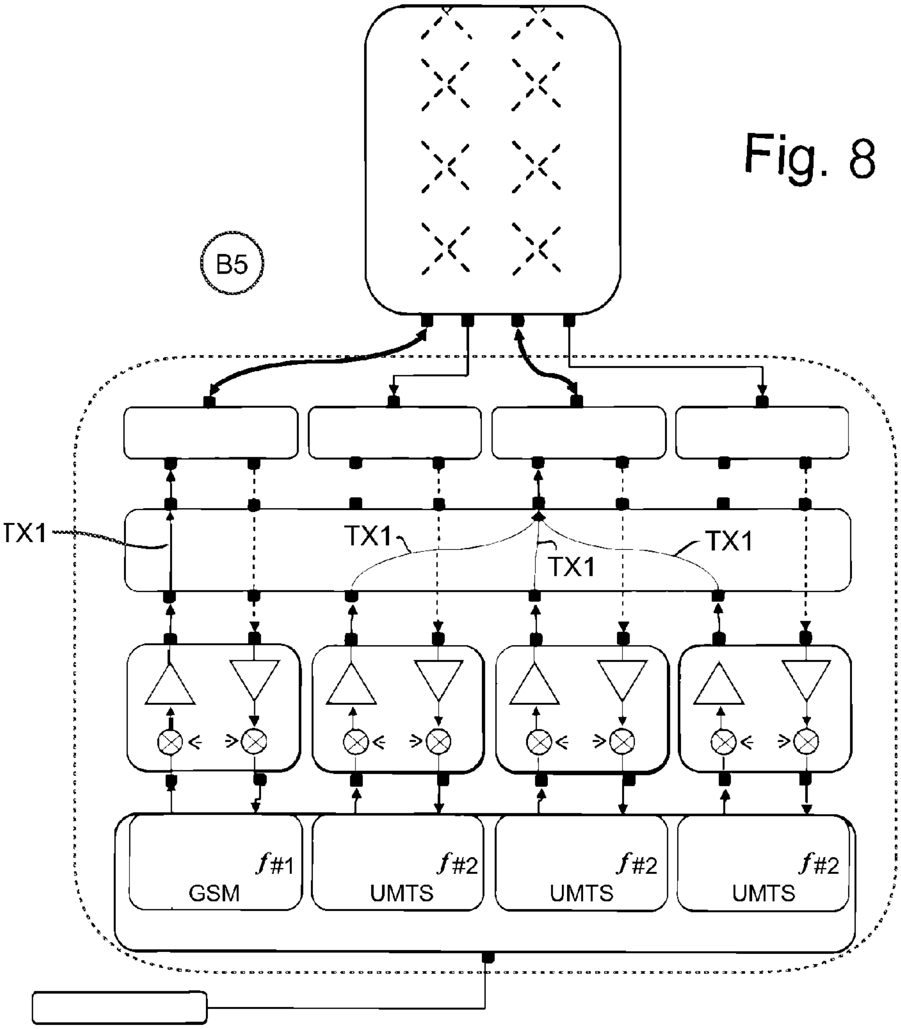
Figure 8A:
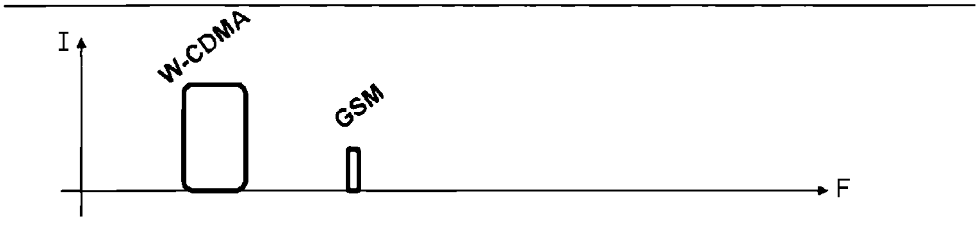

In the following reference is made to FIGS. 8 and 8*a*, in which for example according to configuration B5 (as shown in the attached table) the first channel is operated separately in a GSM standard, and so here a separate transmission signal is radiated (here for example with an amplifier 21 with an amplification power of 25 Watts), whereas the UMTS channels K2 to K3 generate a common transmission signal TX1, which by means of the switching matrix MX is collected on the common output 31.3 and fed via the subordinate duplex filter via the common transmission line 11*c* to the antenna system ANT 3. The reception signals are received via all four antenna systems ANT1 to ANT4 and fed via all four reception lines 11*a* to 11*d* into all four duplex filters DF1 to DF4 of the four transmission channels K1 to K4 and via the said analogue-digital converter and the associated digital signal conditioning ultimately in digitized form are fed to the radio server RS. In this example, therefore, a UMTS transmission signal with a power of, for example, 55 Watts (that is to say with an amplifier of 25 Watts and two amplifiers of 15 Watts) can be achieved.

Further possible configurations B6 to B8 using a GSM channel and three UMTS channels can be inferred from the attached table.

Figure 9:
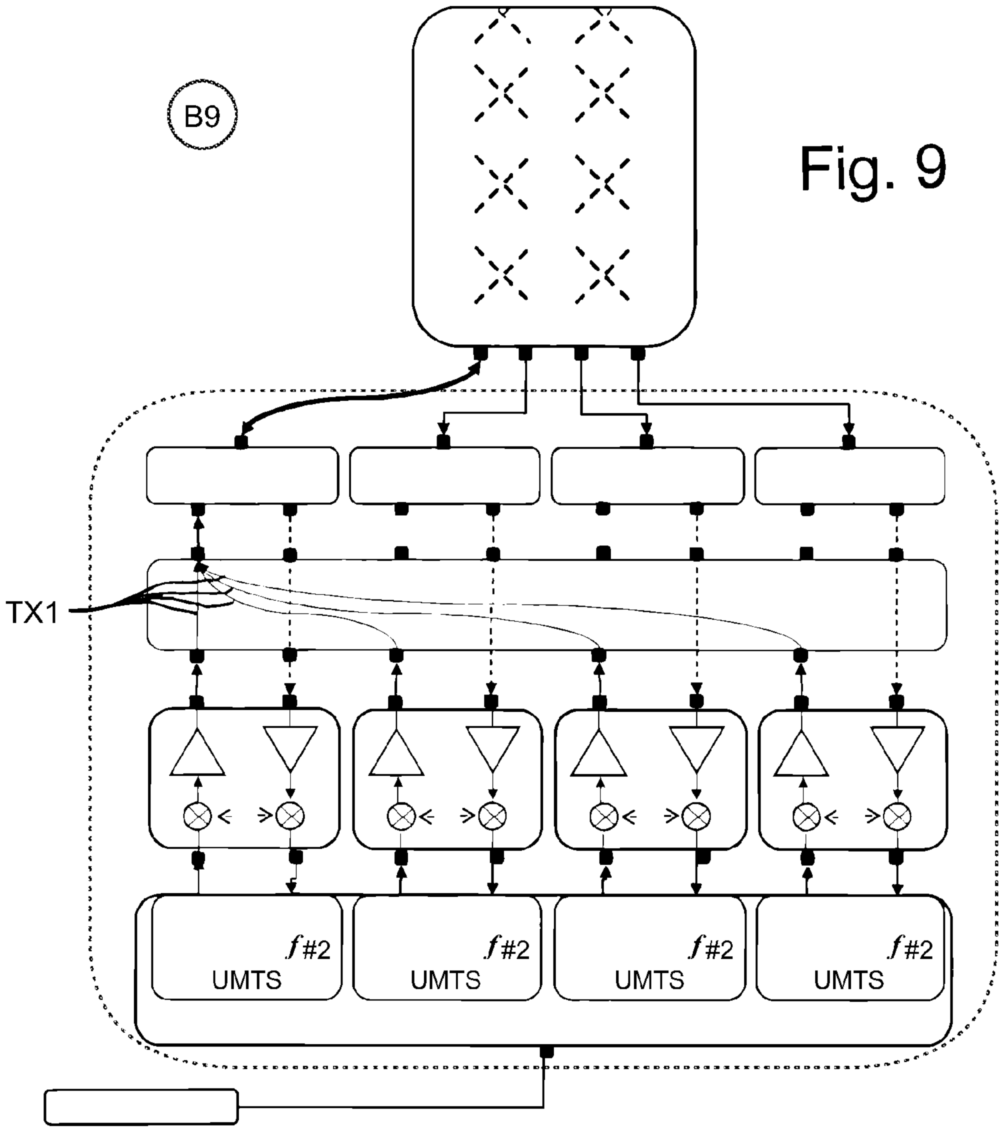
Figure 9A:

According to the embodiment according to FIG. 9 or FIG. 9*a* (corresponding to configuration B9 in the table appended at the end) all four channels K1 to K4 can transmit (and receive) transmission signals TX1 according to the UMTS standard. According to this variant, similar to configuration A1 for the GSM standard, on the basis of the synchronization that has taken place of the four amplifiers the four amplifiers are assigned in-phase with each other (phase-locked), as a result of which the interconnection on a single output for an assigned antenna system is possible. In this way a broad range for this wideband CDMA can be achieved, i.e. the maximum transmission power hereby results for the UMTS transmission signal on one of the antenna slots A1 . . . A4.

Here also further different configurations are possible, with which, for example, two groups of two or at least one group of two plus two individual channels or one group of three channels can be interconnected with a remaining UMTS channel. By differing selection of the channels in the process different signal powers for the UMTS signal can also be achieved, for, as premised in the embodiment shown, the amplifiers 21 work with different powers. In the process all amplifiers can have different powers, so that two amplifiers do not necessarily have to have a high power of for example 25 Watts and two amplifiers a comparatively lower power of for example 15 Watts.

Figure 10:
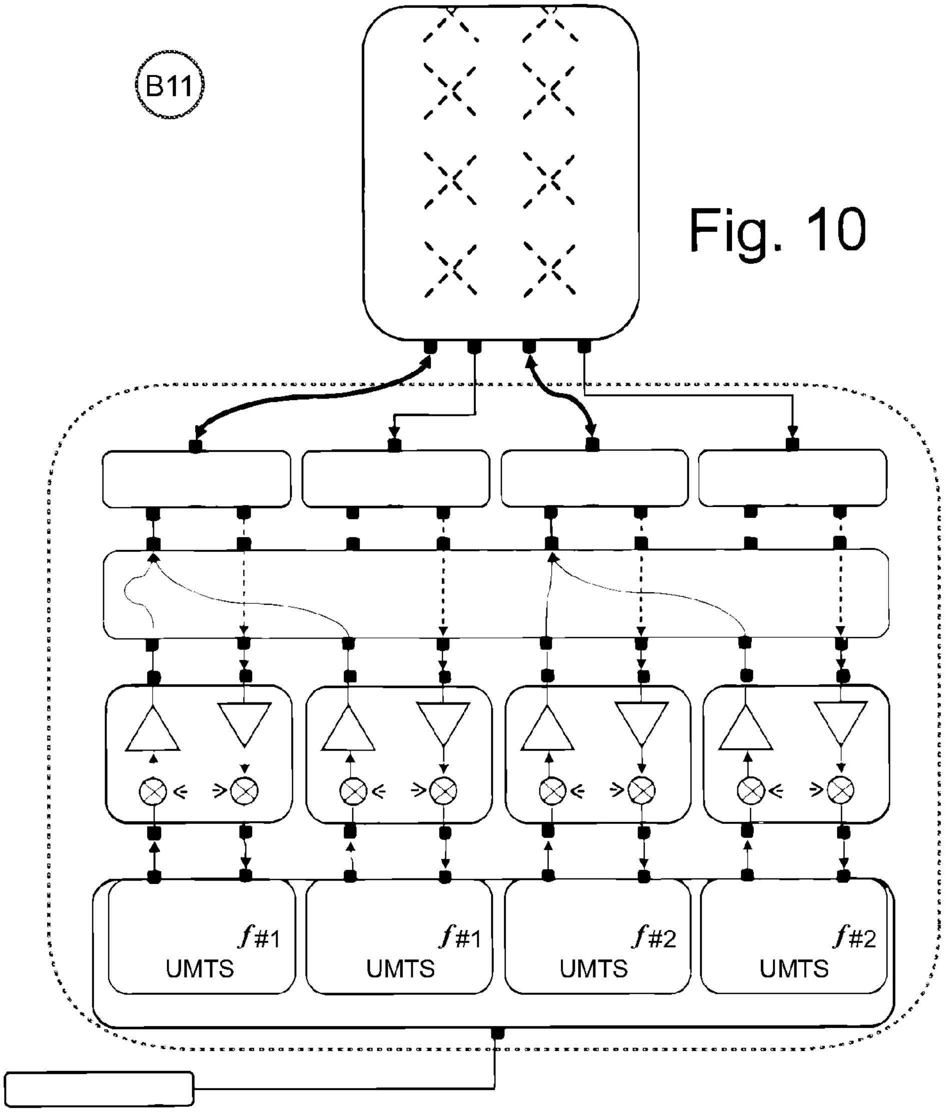
Figure 10A:
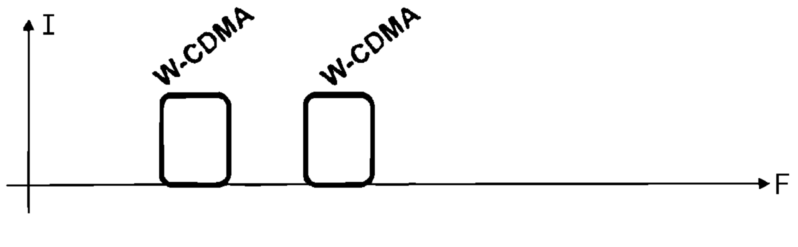

With the help of FIGS. 10 and 10*a* configuration B11 is portrayed, in which in each case two pairs of channels are interconnected on the basis of the phase-locked operation of the amplifiers 21. In this way a UMTS carrier with frequency f#1 with 50 Watts and a UMTS carrier with frequency f#2 with 30 Watts power result. In configuration B13, again, all four UMTS channels are operated at different carrier frequencies f#1 to f#4 separately from one another. In this way four UMTS signals can be transmitted with a bandwidth of, for example, 5 MHz. Even though the total transmission power always stays the same, therefore, the power compared with the preceding example, is spread over four UMTS carriers. In this way the range and the transmission power for each individual carrier are indeed lower, but the four times as many subscribers can be provided for in a cell. A UMTS carrier cannot provide for any number of subscribers and it therefore necessary to make available additional UMTS carriers in the cell if the number of subscribers increases.

Figure 11:
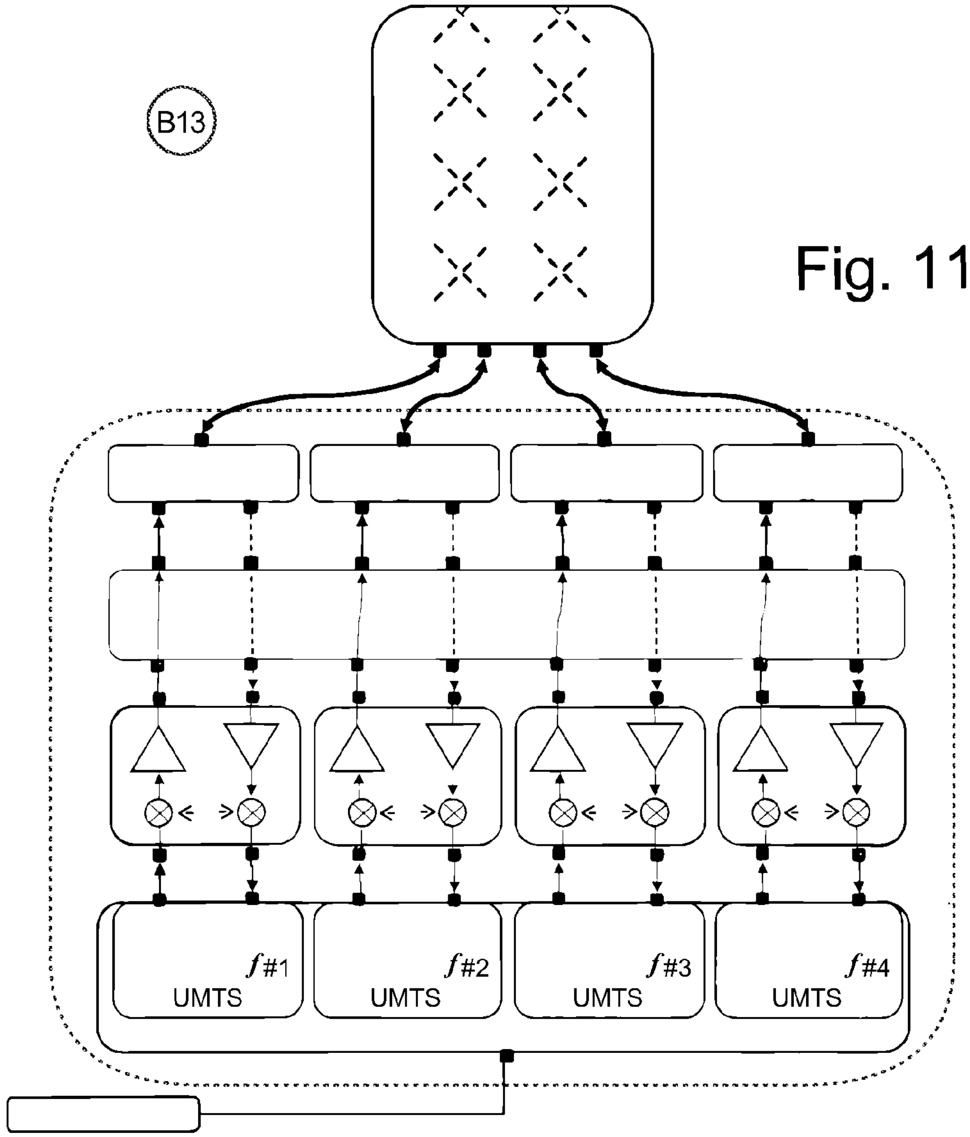
Figure 11A:
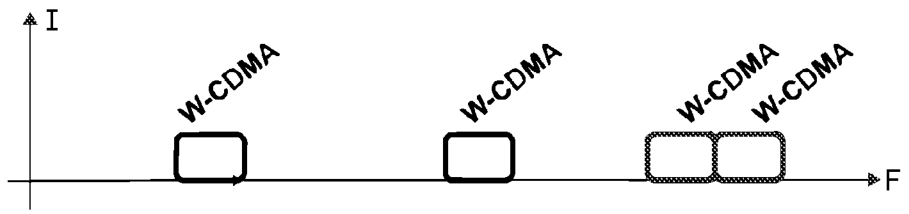

In FIGS. 11 and 11*a* a further example according to configuration B13 is shown, in which the transceiver system is operated separately in all four channels.

In the following further configurations with an expansion in capacity according to the LTE standard are dealt with.

Figure 12:
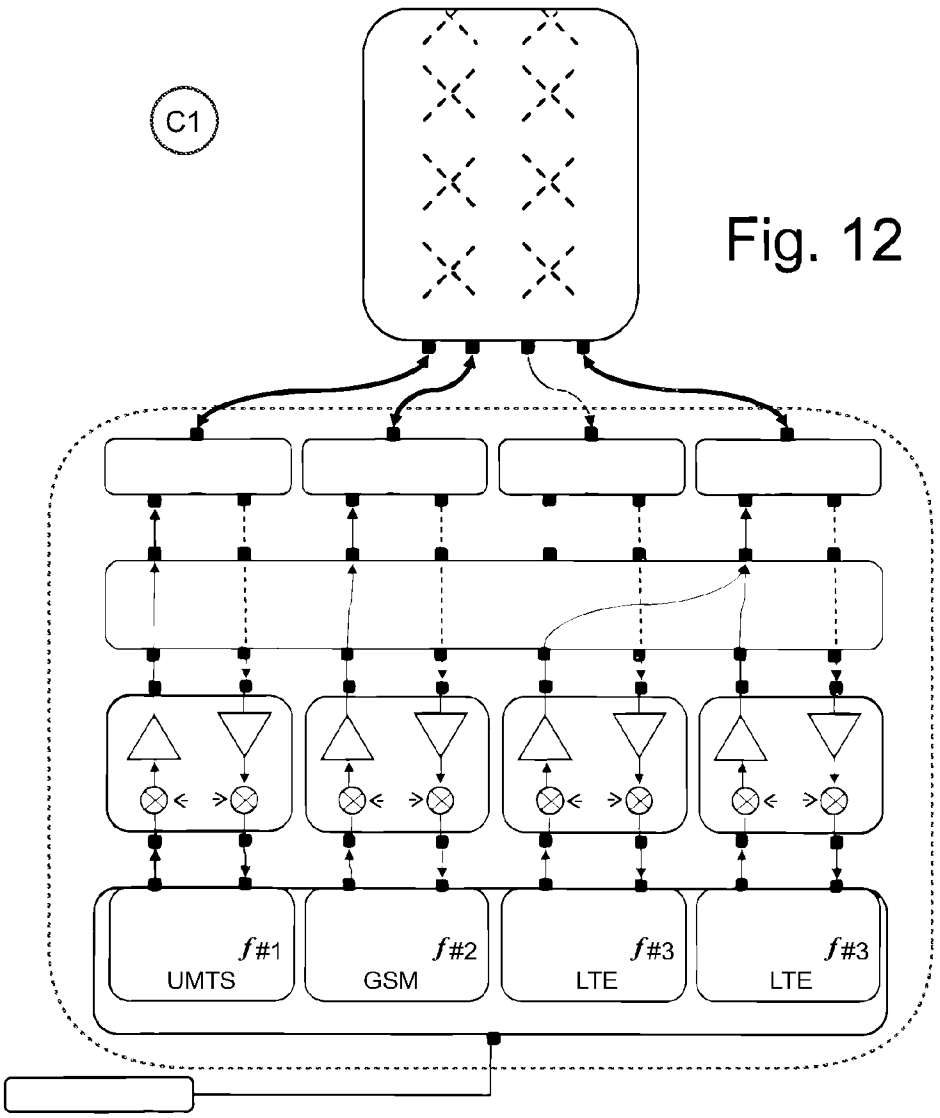
Figure 12A:
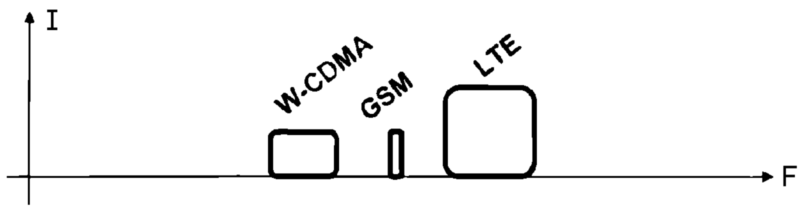

With the help of FIGS. 12 and 12*a* a further variant (configuration C1) is shown, in which in one channel a transmission signal according to the UMTS standard is conditioned with a first carrier frequency f#1, in a second channel K2 a GSM signal is conditioned with a second carrier frequency f#2 and in the third and fourth channels K3 and K4 a signal according to the LTE standard is conditioned with a third carrier frequency f#3 and fed to the assigned three antenna systems ANT1, ANT2, or ANT4. In this way a UMTS signal for example with 25 Watts, a transmission signal according to the GSM standard in the second channel K2 likewise with 25 Watts and through the synchronized interconnection of the two transmission signals TX1 according to the LTE standard for the third and fourth channels K2 and K4 in each case with 15 Watts with the generation of an increased range for this LTE signal with 30 Watts are achieved.

Figure 13:
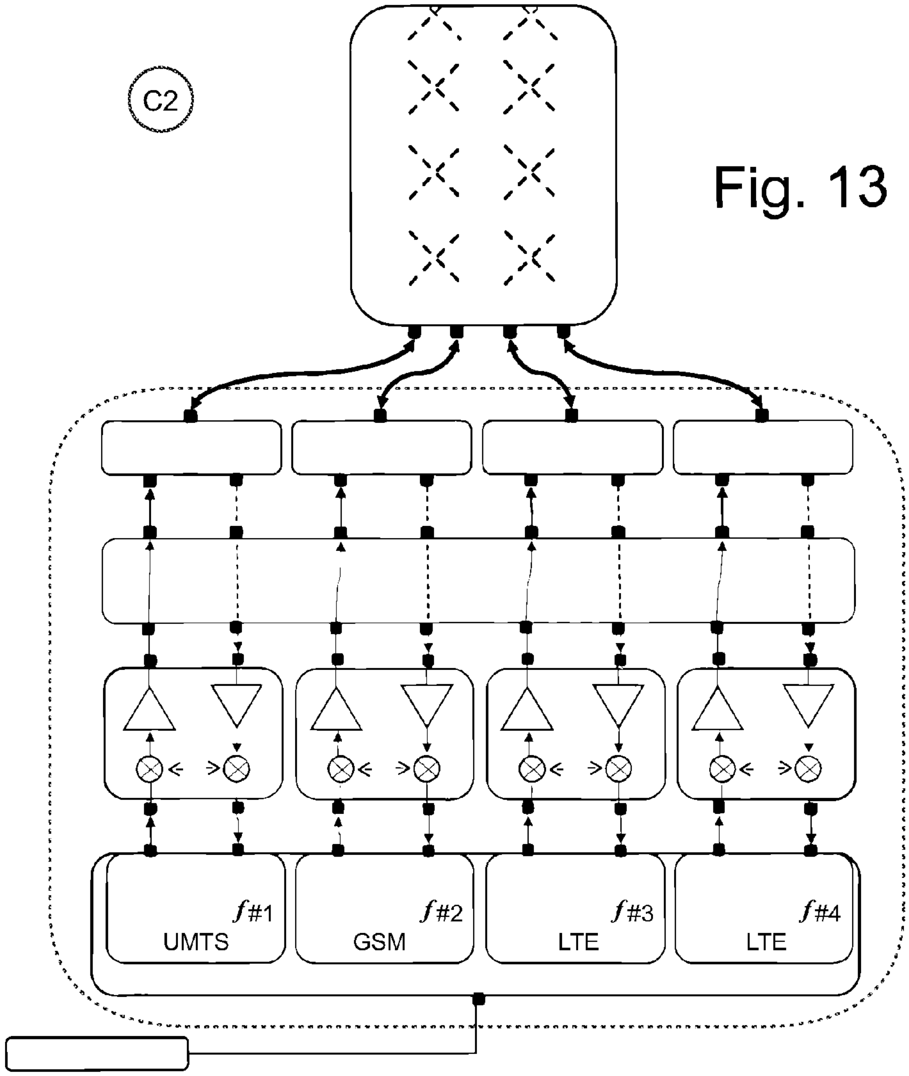
Figure 13A:
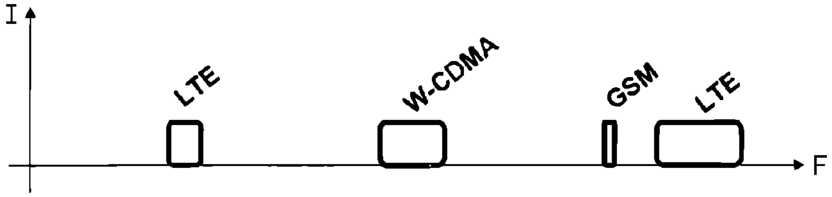

With the help of FIGS. 13 and 13*a* the configuration variant C2 is described, in which all four channels are operated separately, whereby for example the LTE signal is interpreted in the third channel K3 for a lower carrier frequency compared with the carrier frequency for the fourth channels K4 and also the transmission signal TX1 for the third channel is of a narrower band than for the fourth channel. In such a structure the following mobile telephony standards are supported with one transceiver unit:

1 GSM channel with a 200 KHz bandwidth;

1 UMTS channel with a 5 MHz bandwidth; and

2 LTE channels with a bandwidth of between 1.4 and 20 MHz.

With this embodiment the LTE standard is the only standard which allows a variable bandwidth definition.

Figure 14:
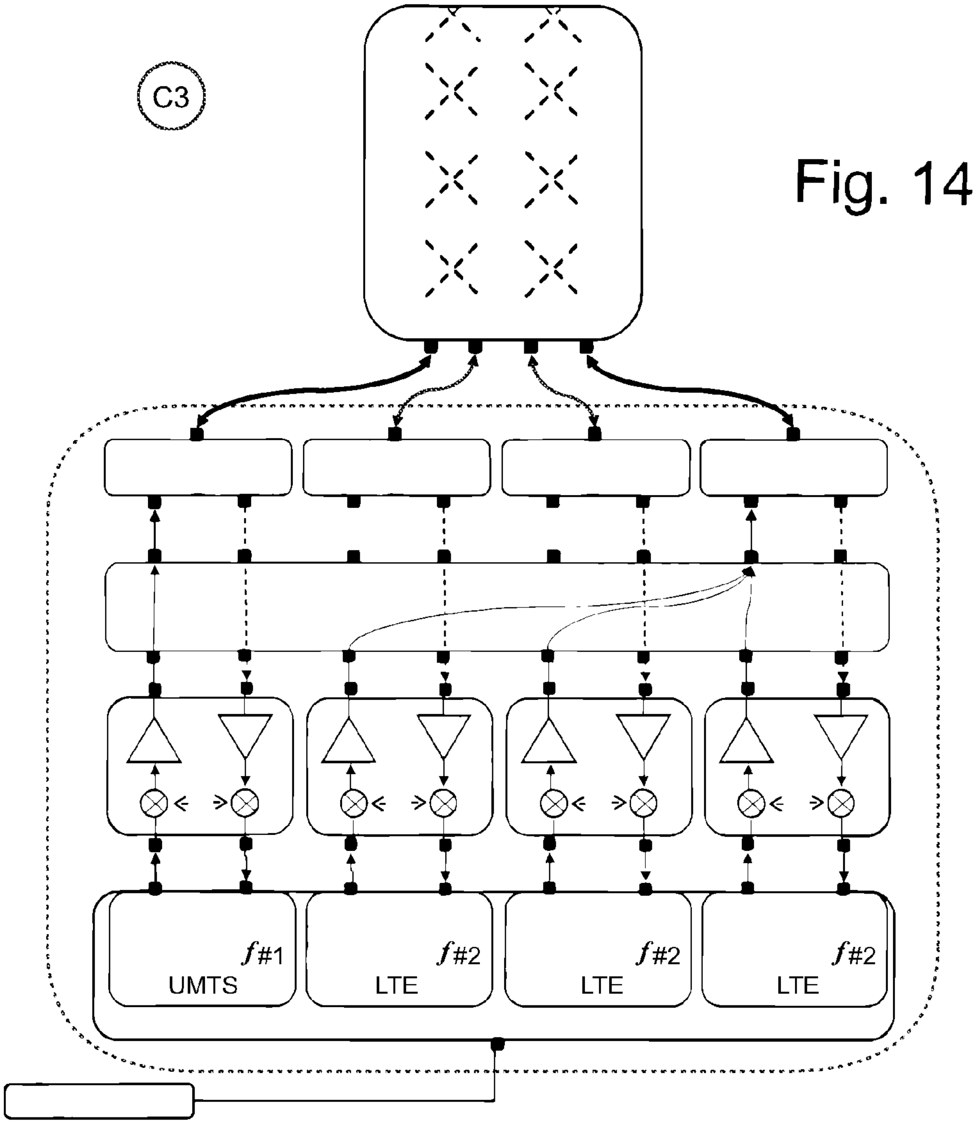
Figure 14A:
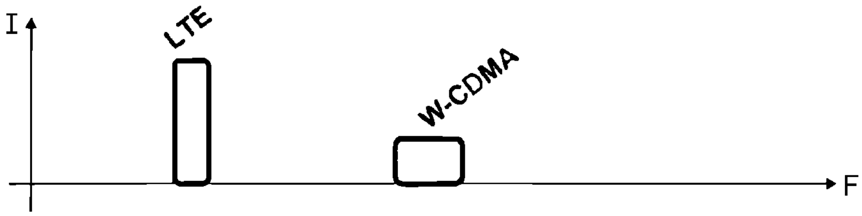

In FIGS. 14 and 14*a* (configuration C3), by way of example one UMTS channel and three LTE channels are provided for, all three of which, by virtue of the in-phase control of the associated amplifiers 21, can be interconnected for generating a common transmission signal TX1. In this way an LTE channel with 55 Watts and a UMTS channel with 25 Watts result.

In the attached table further configurations C4 to C6 are given by way of example, without ultimately showing all variants.

The structure of the remote radio head RRH described with its large variation range, as basically it can be used, is the result above all of the fact that the amplifier 21 is designed for the amplification of the transmission signal as, however, the amplifier 21' is for amplification of the reception signal. The amplifiers are preferably designed in such a way that they can, for example, be used in a frequency range of 1,700 MHz to 2,700 MHz. If the amplifiers could be designed with an even larger broadband range, for example from 800 MHz or 900 MHz to 2,700 MHz, then transmission in the lower frequency ranges could also be implemented. In practice, however, a design for the range from 1,700 MHz to 2,700 MHz can be envisaged, whereby in this frequency range the transmissions according to the GSM, UMTS or LTE methods are feasible.

Figure 15:
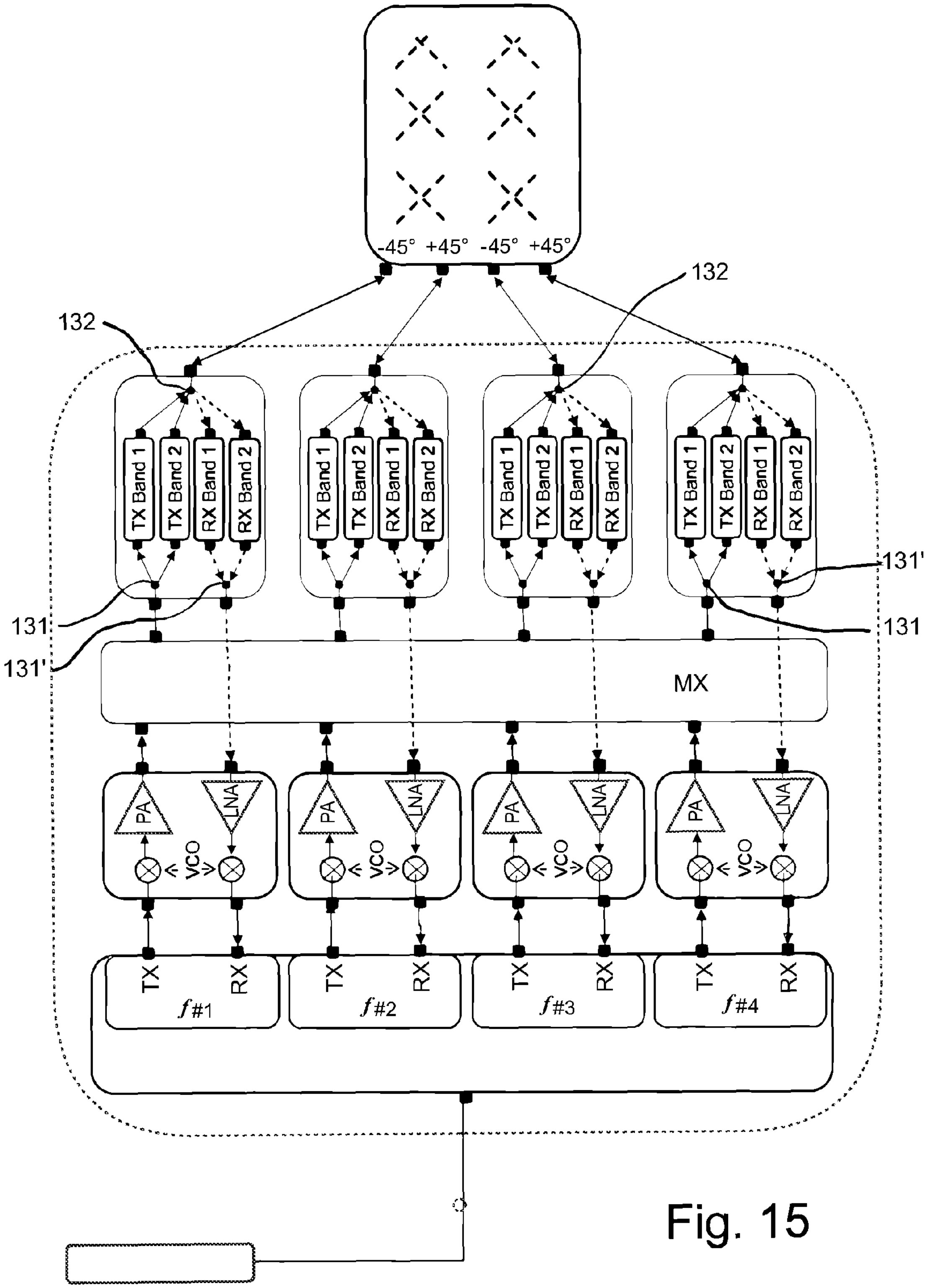
FIG. 15: a modified embodiment with duplex filter device using single band filters connected together.

If with regard to the broadband range of the duplex filters DF1 to DF4 used problems were to arise, then—as shown with the help of a variant according to FIG. 15—an improvement can be achieved in that the duplex filter devices DF1 to DF4, here preferably in the form of band-pass filters, are arranged for the individual frequency bands with individual band filters connected in parallel for the transmission signal TX or for the reception signal RX. To this end, according to the embodiment according to FIG. 15, the band-pass filters are respectively equipped with two TX band filters connected in parallel for different bandwidths and two RX band filters connected in parallel likewise for different bandwidths, which respectively are interconnected to the inputs and outputs via common star points 131 or 131' and on the antenna side opposite via a common star point 132.

The ideal is a duplex filter with frequency trimming which adjusts or is adjusted to the transmission and reception frequency used in the channel. Because of the high intermodulation requirements essentially only mechanical components whose frequency can be trimmed, such as for example NEMS, piezo elements or motor drives, are considered for this.

The PA power amplifier 21 for the transmission signals and the reception amplifier 21' (LNA amplifier) for the reception signals are preferably designed with such a broadband range that they cover the entire frequency range necessary.

The digital platform according to channel-module stage A referred to in particular in connection with FIG. 2 can at the four outputs/inputs of the individual slots of various mobile telephony standards, make available frequencies (and variable bandwidths) in the entire frequency range required.

Figure 16:
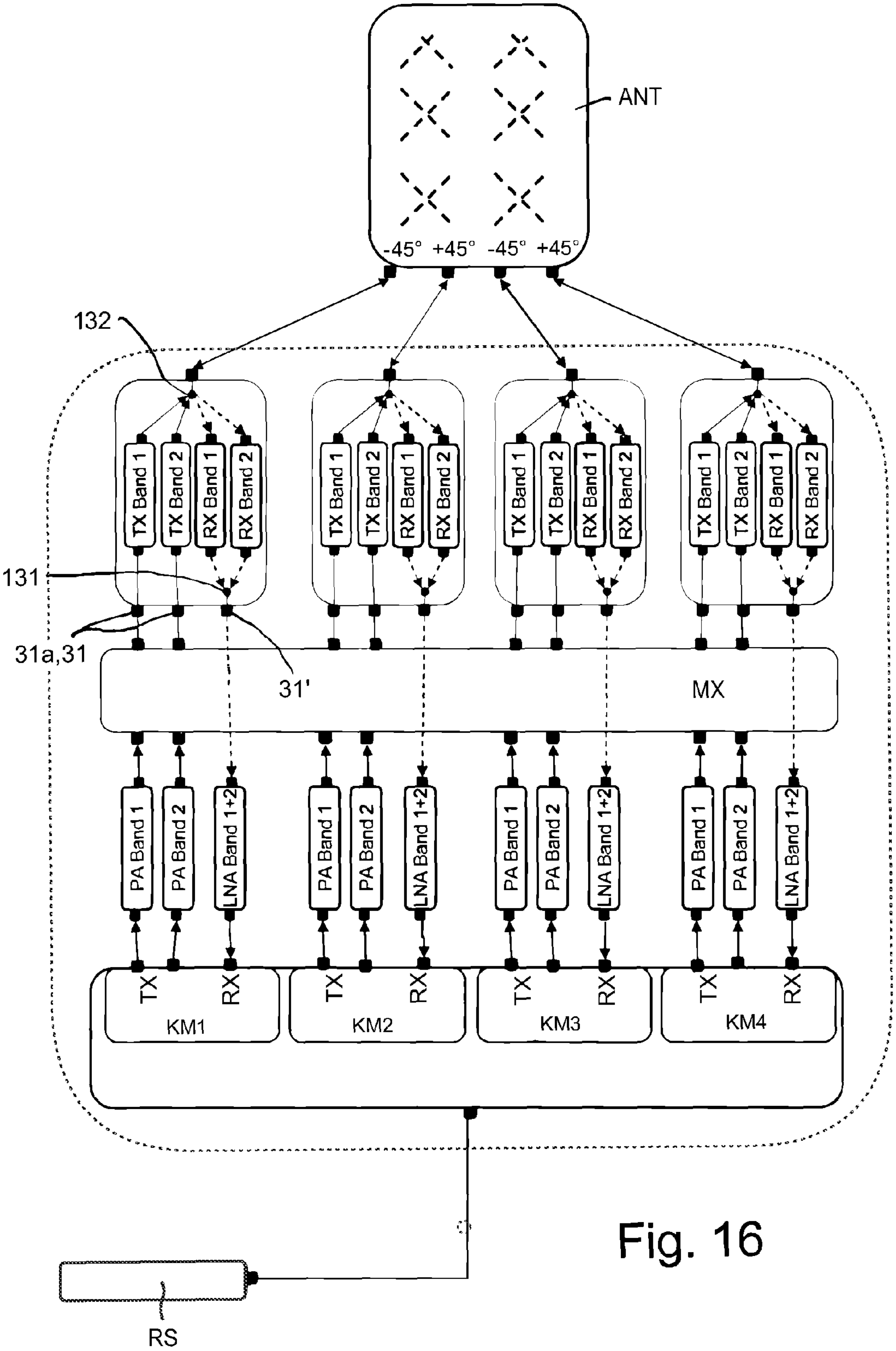
FIG. 16: an again modified embodiment with interconnection of the various filter stages connected in parallel in the respective transmission branch that differs from FIG. 15 and with a broadband design power amplifier.

Finally, reference is also made to a further modification according to FIG. 16, in which a modification for the second stage B is illustrated.

With this variant also, similar to in FIG. 15, the filters provided for in filter stage D and preferably created as band-pass filters, for the individual frequency bands are arranged by connection in parallel of at least two (or even more) filter stages, whereby the filter stages TX-band 1 and TX-band 2 for the respective transmission signal TX on the output (thus leading to the antenna systems ANT) are interconnected via a common star point 132. On the input side 31 or 31' only the RX filters for the reception signals are interconnected at a star point 131. The input connections for the TX filters for the transmission signals for the individual frequency bands are in contrast formed separately, namely via two inputs 31*a*. This applies to each filter band arrangement in all four channels.

The power amplifiers 21 (PA amplifiers) are constructed separately for the individual frequency bands. The reception amplifiers (LNA amplifiers) 19' are designed with a broadband range and cover the entire required frequency range.

The digital platform according to the channel module stage A can at the four outputs/inputs of the individual slots of various mobile telephony standards, make available frequencies (and variable bandwidths) in the entire frequency range required, just as in the embodiment according to FIG. 15.

Since for the transmission signals TX separate power amplifiers 21 are used for the various frequency bands, according to a further variant the digital platform (channel module stage A) for the transmission path can make available separate outputs for each individual frequency band, which are then transmitted in parallel.

Therefore the most varied of embodiments have been described which allow a highly variable operation of the transceiver unit (RRH). The variability is the result of the different configuration possibilities in the digital platform A, whereby here the most varied of mobile telephony standards, such as GSM, UMTS, LTE and so on, can be achieved, and in fact in any composition. Above all as a result of the switching matrix arranged in the transmission direction prior to the duplex filters DF it is possible to achieve the high variability, since here the most varied composition of the transmission signals is possible where necessary. In the switching matrix the outputs from the transmission amplifier can be switched through directly to the duplex filter or in the case of the bringing together of amplifier outputs normally one or more passive combiners (normally Wilkinson combiners) are interconnected, so that in this way a resultant transmission amplifier with one or more outputs emerges. The combiners, preferably Wilkinson combiners or hybrid combiners, perform the task of decoupling the amplifier outputs and adaptation at the interconnection point.

The overall structure is such that preferably an operation of the transceiver module (RRH) for various standardized mobile telephony frequency ranges is possible, preferably for those whose ratio between top and bottom frequencies is a maximum of 2:1, so that in this way simultaneous operation in up to three mobile telephony frequency ranges is possible, whereby each channel is preferably operated in a maximum of one frequency band only.

Finally, it is also possible to operate the RRH in the various channels in such a way that individual amplifiers of a channel work in non-linearized mode, for example AB- or B-mode. In this way linear and non-linear amplified signals will be combined at the antenna. Thus high levels of efficiency of amplifiers in non-linear mode can be taken advantage of. Such an amplifier will normally be designed to be switchable, so that it can work in a linearized or non-linearized mode.

The linearized or non-linearized mode is achieved by a shifting or switching of the operating point in the end stage.

In summary, therefore, it can be established that in the context of the device according to the invention, it is possible

- to support the most varied of standards;
- to configure the system as a whole in a number of ways (whereby the usage range is significantly improved with less effort compared to conventional solutions);
- to transmit different carriers (carrier frequencies) over various branches (channels) or if necessary to interconnect these where required, and
- to also create a multi-frequency range arrangement (multi-band), if in particular the power amplifiers and/or the duplex filters are created from multiple components connected in parallel or contain tuneable filters, in order to improve the broadband range.

With the help of the embodiments portrayed it has been shown that in the context of the invention not only a high variability in terms of the device for transmission and reception of signals, in particular for the area of mobile telephony, can be ensured, but that furthermore optimum adaptation or preparatory set-up is possible, in order to operate the entire system in an unknown manner in the broadband range, for example in that:

- the duplex filters comprise at least two transmission signal band-pass filters connected in parallel, and which on the input side are interconnected via a star point and if necessary on the antenna side also are interconnected via a shared star point;
- the duplex filters can be automatically tuned or tracked in terms of frequency or at least contain a filter that can have the frequency tuned or tracked.

Finally, in the context of the various embodiments it has also been explained how the device for transmission and reception of the corresponding signals, in particular for the mobile telephony area, allows an in-phase radiation of the various TX signals, in order thereby to generate a resultant radiation diagram, whereby the filter stages on the antenna side can be controlled by channel via the power amplifier assigned or preferably a switching matrix is provided in between these, in order to be able to operate the system as a whole differently. In an equivalent way a radiation forming for the reception case can also be carried out.

On the basis of the device structure illustrated a corresponding method also thereby emerges of how this device is operated, and how therefore in the individual channels the transmission signals can be amplified, coupled in-phase or phase-locked and finally summated in corresponding operating modes, in order, for certain standards, to allow an expansion of capacity or an increased range of the transmission signal. This being the case, in connection with the device illustrated, a corresponding method for operation of such a device is also obvious in its entirety.

Example: Configuration A: ONE STANDARD (e.g. GSM)

| Configuration | RHH Slot 1 | RHH Slot 2 | RHH Slot 3 | RHH Slot 4 | Interconnection of Result slots | Interconnection of the transmission channels via a switching matrix | Application/ purpose |
|---|---|---|---|---|---|---|---|
| 4 GSM channels GSM_TX1 . . . GSM TX4 | | | | | | | |
| A1 | GSM Tx1 | GSM Tx1 | GSM Tx1 | GSM Tx1 | Yes Slot 1 + slot 2 + slot 3 + slot 4 | 1 GSM channel with 80 Watts | Large range |
| A2 | GSM Tx1 | GSM Tx1 | GSM Tx2 | GSM Tx2 | Yes Slot 1 + slot 3 slot 2 + slot 4 | 1 GSM channel with 50 Watts 1 GSM channel with 30 Watts | Doubling of capacity with a good range |

-continued

| Example: Configuration A: ONE STANDARD (e.g. GSM) | | | | | | | |
|---|---|---|---|---|---|---|---|
| | RHH | | | | Interconnection of Result | Interconnection of the transmission channels via a switching | Application/ |
| Configuration | Slot 1 | Slot 2 | Slot 3 | Slot 4 | slots | matrix | purpose |
| A3 | GSM Tx1 | GSM Tx2 | GSM Tx1 | GSM Tx2 | Yes Slot 1 + slot 2 slot 3 + slot 4 | 2 GSM channels with 40 Watts each | Doubling of capacity with a good range |
| A4 | GSM Tx1 | GSM Tx2 | GSM Tx3 | GSM Tx3 | No | 2 GSM channels with 25 W each 2 GSM channels with 15 W each | Maximum capacity |

| Example: 2 STANDARDS (e.g. GSM and UMTS) | | | | | | | |
|---|---|---|---|---|---|---|---|
| | RHH | | | | Interconnection of Result | Interconnection of the transmission channels via a switching | Application/ |
| Configuration | Slot 1 | Slot 2 | Slot 3 | Slot 4 | slots | matrix | purpose |
| Starting configuration B: 2 GSM channels and 2 UMTS channels | | | | | | | |
| B1 | GSM Tx1 | GSM Tx1 | UMTS Tx1 | UMTS Tx1 | Yes Slot 1 + slot 2 + slot 3 + slot 4 | 1 GSM channel with 50 Watts 1 UMTS channel with 30 Watts | Increased GSM range Increased UMTS range |
| B2 | GSM Tx1 | GSM Tx1 | UMTS Tx1 | UMTS Tx2 | Yes Slot 1 + slot 2 | 1 GSM channel with 50 Watts 2 UMTS channels with 15 Watts each | Increased GSM range UMTS capacity expansion |
| B3 | GSM Tx1 | GSM Tx2 | UMTS Tx1 | UMTS Tx1 | Yes Slot 3 + slot 4 | 2 GSM channels with 25 Watts each 1 UMTS channel with 30 Watts | GSM capacity expansion Increased UMTS range |
| B4 | GSM Tx1 | GSM Tx2 | UMTS Tx1 | UMTS Tx2 | No | 2 GSM channels with 25 W each 2 UMTS channels with 15 W each | GSM capacity expansion UMTS capacity expansion |

-continued

| Example: 2 STANDARDS (e.g. GSM and UMTS) | | | | | | | |
|---|---|---|---|---|---|---|---|
| | RHH | | | | Interconnection of Result | Interconnection of the transmission channels via a switching | Application/ |
| Configuration | Slot 1 | Slot 2 | Slot 3 | Slot 4 | slots | matrix | purpose |
| Switching of a GSM channel to UMTS | | | | | | | |
| B5 | GSM Tx1 | UMTS Tx1 | UMTS Tx1 | UMTS Tx1 | Yes Slot 2 + slot 3 + slot 4 | 1 GSM channel with 25 Watts 1 UMTS channel with 55 Watts | Increased UMTS range |
| B6 | GSM Tx1 | UMTS Tx1 | UMTS Tx2 | UMTS Tx2 | Yes Slot 3 + slot 4 | 1 GSM channel with 25 Watts 1 UMTS channel with 25 Watts 1 UMTS channel with 30 Watts | GSM range UMTS capacity expansion |
| B7 | GSM Tx1 | UMTS Tx1 | UMTS Tx1 | UMTS Tx2 | Yes Slot 2 + slot 3 | 1 GSM channel with 25 Watts 1 UMTS channel with 40 Watts 1 UMTS channel with 15 Watts | UMTS capacity expansion |
| B8 | GSM Tx1 | UMTS Tx1 | UMTS Tx2 | UMTS Tx3 | No | 1 GSM channel with 25 Watts 1 UMTS channel with 40 Watts 2 UMTS channels with 15 Watts each | UMTS capacity expansion |
| Switching of second GSM channel to UMTS | | | | | | | |
| B9 | UMTS Tx1 | UMTS Tx1 | UMTS Tx1 | UMTS Tx1 | Yes Slot 1 + slot 2 + slot 3 + slot 4 | 1 UMTS channel with 80 Watts | Maximum UMTS range |
| B10 | UMTS Tx1 | UMTS Tx2 | UMTS Tx2 | UMTS Tx2 | Yes Slot 2 + slot 3 + slot 4 | 1 UMTS channel with 25 Watts 1 UMTS channel with 55 Watts | UMTS capacity expansion |
| B11 | UMTS Tx1 | UMTS Tx1 | UMTS Tx2 | UMTS Tx2 | Yes Slot 1 + slot 2 slot 3 + slot 4 | 1 UMTS channel with 50 Watts 1 UMTS | UMTS capacity expansion |

-continued

Example: 2 STANDARDS (e.g. GSM and UMTS)

| Configuration | RHH Slot 1 | RHH Slot 2 | RHH Slot 3 | RHH Slot 4 | Interconnection of Result slots | Interconnection of the transmission channels via a switching matrix | Application/ purpose |
|---|---|---|---|---|---|---|---|
| | | | | | | channel with 30 Watts | |
| B12 | UMTS Tx1 | UMTS Tx2 | UMTS Tx1 | UMTS Tx2 | Yes Slot 1 + slot 3 slot 2 + slot 4 | 1 UMTS channel with 40 Watts 1 UMTS channel with 40 Watts | UMTS capacity expansion |
| B13 | UMTS Tx1 | UMTS Tx2 | UMTS Tx3 | UMTS Tx4 | No | 2 UMTS channels with 25 Watts 2 UMTS channels with 15 Watts | Maximum UMTS capacity |

Example: 3 STANDARDS (e.g. GSM, UMTS and LTE) -

| Configuration | RHH Slot 1 | RHH Slot 2 | RHH Slot 3 | RHH Slot 4 | Interconnection of Result Islots | Interconnection of the transmission channels via a switching matrix | Application/ purpose |
|---|---|---|---|---|---|---|---|
| Starting configuration B: 1 GSM channel, 1 UMTS channel and 2 LTE channels | | | | | | | |
| C1 | UMTS Tx1 | GSM Tx2 | LTE Tx3 | LTE Tx3 | Yes Slot 3 + slot 4 | 1 GSM channel with 25 Watts 1 UMTS channel with 25 Watts 1 LTE channel with 30 Watts | Increased LTE transmission power |
| C2 | UMTS Tx1 | GSM Tx2 | LTE Tx3 | GSM Tx4 | No | 1 GSM channel with 25 Watts 1 UMTS channel with 25 Watts 2 LTE channels with 15 Watts each | LTE capacity expansion |
| Switching of a GSM channel to LTE | | | | | | | |
| C3 | UMTS Tx1 | LTE Tx2 | LTE Tx2 | LTE Tx2 | Yes Slot 2 + slot 3 + slot 4 | 1 UMTS channel with 25 Watts 1 LTE | Increased LTE transmission power |

-continued

| Example: 3 STANDARDS (e.g. GSM, UMTS and LTE) - | | | | | | | |
|---|---|---|---|---|---|---|---|
| | RHH | | | | Interconnection of Result | Interconnection of the transmission channels via a switching | Application/ |
| Configuration | Slot 1 | Slot 2 | Slot 3 | Slot 4 | Islots | matrix | purpose |
| | | | | | | channel with 55 Watts | |
| C4 | UMTS Tx1 | LTE Tx2 | LTE Tx3 | LTE Tx4 | No | 1 UMTS channel with 25 Watts 1 LTE channel with 25 Watts 2 LTE channels with 15 Watts each | LTE capacity expansion |
| C5 | UMTS Tx1 | LTE Tx2 | LTE Tx3 | LTE Tx3 | Yes Slot 3 + slot 4 | 1 UMTS channel with 25 Watts 1 LTE channel with 25 Watts 1 LTE channel with 30 Watts | LTE capacity expansion |
| C6 | UMTS Tx1 | LTE Tx2 | LTE Tx2 | LTE Tx3 | Yes Slot 2 + slot 3 | 1 UMTS channel with 25 Watts 1 LTE channel with 40 Watts 1 LTE channel with 15 Watts | LTE capacity expansion |
| Switching of a UMTS channel to LTE | | | | | | | |
| C7 | LTE Tx2 | LTE Tx2 | LTE Tx2 | LTE Tx2 | Yes Slot 1 + slot 2 + slot 3 + slot 4 | 1 LTE channel with 80 Watts | Maximum LTE transmission power |

The invention claimed is:

1. A device for transmitting mobile telephony signals-by multiple transmit branches, the device comprising a remote radio head (RRH) which is positioned near to an antenna and remotely to a radio server or base station, the remote radio head being connected to the radio server or base station by a main connecting line, the remote radio head comprising:

at least 4 radio frequency channels (K1, K2, K3, K4) each comprising a transmitter unit for sending radio frequency transmission signals (TX), at least one power amplifier provided in each of said radio frequency channels (K1, K2, K3, K4) for conditioning the radio frequency transmission signals (TX), connections on the antenna side for sending the radio frequency transmission signals (TX) with a downstream radio frequency antenna device (ANT; ANT1, ANT2, ANT3, ANT4), a filter stage (DF1, DF2, DF3, DF4) provided in each said radio frequency channel (K; K1, K2, K3, K4);

separate channel modules (KM1, KM2, KM3, KM4), each of the at least 4 radio frequency channels (K1, K2, K3, K4) configured to be driven or fed with a radio frequency transmission signal that is different from the other channels, generated with the separate channel modules (KM1, KM2, KM3, KM4) from various digital data streams, the digital data streams for generating RF transmitting signals in separate radio frequency channels (K1, K2, K3, K4) being transmitted via the common main connecting line; and a controller device, via which several or all of the power amplifiers, which are connected in several or all of the at least 4 radio frequency channels (K; K1, K2, K3, K4), in-phase or phase-locked with each other, in such a way that the radio frequency transmission signals (TX) amplified in the radio frequency channels (K; K1, K2, K3, K4) are synchronized and interconnected and within a same radio frequency band, as a result of which a transmission signal can be radiated with a higher transmission power.

2. The device as claimed in claim 1, further including a duplex filter (DF1, DF2, DF3, DF4) comprising at least two transmission signal band-pass filters connected in parallel, which on the antenna side are combined via a star point.

3. The device as claimed in claim 2, further including duplex filters (DF1, DF2, DF3, DF4) for the radio frequency transmission signals (TX) connected in parallel and covering various frequency ranges on the antenna side and input side interconnected in each case via a common star point.

4. The device as claimed in claim 1, further including duplex filters that are configured to be automatically frequency tuned or tracked or at least contain a filter that can be automatically frequency tuned or tracked.

5. The device as claimed in claim 1, further including a switching matrix (MX) provided between the connections on the base station side of duplex filters (DF1, DF2, DF3, DF4) and power amplifiers for amplification of the transmission signal (TX).

6. The device as claimed in claim 5, further including interconnections of the switching matrix (MX) different amplifiers from different ones of the at least four radio frequency channels (K; K1, K2, K3, K4) on the transmission side, the interconnections being structured in such a way that the separately amplified radio frequency transmission signals (TX) concerned are summed in a synchronized manner.

7. The device as claimed in claim 5, wherein the switching matrix (MX) contains couplers for decoupled interconnection of outputs of the power amplifiers.

8. The device as claimed in claim 1, further including a summer for in-phase summation of radio frequency reception signals (RX) for generating a resultant radiation diagram.

9. The device as claimed in claim 1, wherein the controller device linearizes the amplified radio frequency transmission signals (TX) in the at least 4 radio frequency channels (K; K1, K2, K3, K4).

10. The device as claimed in claim 1, wherein the power amplifiers in the at least 4 radio frequency channels (K; K1, K2, K3, K4) are at least in part operated with differing transmission power or phase angle.

11. The device as claimed in claim 1, wherein in the individual ones of the at least 4 radio frequency channels (K; K1, K2, K3, K4), radio frequency transmission signals (TX) are transmitted according to the same or a different mobile telephony standard.

12. The device as claimed in claim 1, wherein in the individual ones of the at least 4 radio frequency channels (K; K1, K2, K3, K4), radio frequency transmission signals (TX) according to any combination of two or more standards GSM, UMTS, LTE or WiMAX are transmitted.

13. The device as claimed in claim 1, wherein the power amplifiers in the at least 4 radio frequency channels (K; K1, K2, K3, K4) are designed with a broadband range, with a range that exceeds one transmission band (GSM or UMTS or LTE band).

14. The device as claimed in claim 1, wherein outputs of the amplifier in the case of the combining of radio frequency transmission signals (TX) amplified in different ones of the at least 4 radio frequency channels (K1, K2, K3, K4) takes place on one or more passive combiners, to thereby form a transmission amplifier with one or more outputs.

15. The device as claimed in claim 14, wherein the one or more passive combiners comprises a Wilkinson combiner or a hybrid combiner.

16. The device as claimed in claim 14, wherein the combiner is structured to decouple the outputs of the power amplifiers or an adaptation at the interconnection point.

17. A remote radio head for transmitting mobile telephony signals by multiple branches, the remote radio head being connected to a base station or radio server via a main line, the remote radio head comprising:

at least 4 radio frequency channels each comprising a transmitter unit configured to send radio frequency transmission signals, at least one power amplifier provided for each radio frequency channel, said power amplifiers being configured to condition the radio frequency transmission signal-s within the associated radio frequency channel, connections on the antenna side configured to send the radio frequency transmission signals with a downstream radio frequency antenna device, at least four filter stages respectively associated with the at least four radio frequency channels;

separate radio frequency channel modules, each of the at least 4 radio frequency channel modules being structured to be driven or fed with a radio frequency transmission signal that is different from the radio frequency transmission signals of the other radio frequency channels, generated with a separate radio frequency channel module from digital-data streams transmitted via the main line; and a controller device, via which at least some of the power amplifiers, which are connected in the radio frequency channels that are in-phase or phase-locked with each other, in such a way that the radio frequency transmission signals amplified in the radio frequency channels are synchronized and interconnected and within a common radio frequency band, as a result of which a transmission signal can be radiated with a higher transmission power.

18. The remote radio head of claim 17 further including a radio frequency receiver in each of the at least four radio frequency channels configured to receive radio frequency reception signals.

19. The device for transmitting of claim 1 further including a radio frequency receiver in each of the at least 4 radio frequency channels (K1, K2, K3, K4) for receiving radio frequency signals (RX).

20. A method of operating a remote radio head connected to a base station or radio server via a main line, the method comprising:

operating at least four radio frequency channels each comprising a transmitter unit to send radio frequency transmission signals, conditioning the radio frequency transmission signals using at least one power amplifier provided for each of the at least four radio frequency channels, sending the radio frequency transmission signals to a downstream radio frequency antenna device via connections on an antenna side of the remote radio head, controlling each of the at least 4 radio frequency channel modules from digital data streams transmitted via the main line;

using at least some of the power amplifiers which are connected in the radio frequency channels that are in-phase or phase-locked with each other to amplify and synchronize the radio frequency transmission signals in the radio frequency channels within a common radio frequency band, and radiating the amplified and synchronized radio frequency transmission signals with the radio frequency antenna device.

21. The method of claim 20 further including processing radio frequency signals received by the radio frequency antenna device with each of the radio frequency channel modules.

* * * * *